(12) United States Patent
Lee

(10) Patent No.: US 9,355,590 B2
(45) Date of Patent: May 31, 2016

(54) SPARKLE DISPLAY

(71) Applicant: Vincent Lee, San Francisco, CA (US)

(72) Inventor: Vincent Lee, San Francisco, CA (US)

(73) Assignee: AliphCom, San Francisco, CA (US)

(*) Notice: Subject to any disclaimer, the term of this patent is extended or adjusted under 35 U.S.C. 154(b) by 0 days.

(21) Appl. No.: 14/183,425

(22) Filed: Feb. 18, 2014

(65) Prior Publication Data
US 2015/0235593 A1    Aug. 20, 2015

(51) Int. Cl.
*G09G 3/32* (2006.01)
*G02F 1/1335* (2006.01)
*G09G 3/20* (2006.01)
*G02F 1/1333* (2006.01)

(52) U.S. Cl.
CPC ........ *G09G 3/3208* (2013.01); *G02F 1/133504* (2013.01); *G02F 2001/133391* (2013.01); *G02F 2201/44* (2013.01); *G09G 3/20* (2013.01); *G09G 2300/023* (2013.01); *G09G 2300/0465* (2013.01)

(58) Field of Classification Search
CPC ..................... G06F 3/1446; G09G 2310/0232; H04N 5/72
USPC .................................................... 345/1.3, 76
See application file for complete search history.

(56) References Cited

U.S. PATENT DOCUMENTS

| | | | |
|---|---|---|---|
| 5,808,589 A * | 9/1998 | Fergason ........................ 345/8 |
| 2004/0227703 A1* | 11/2004 | Lamvik et al. ................. 345/76 |
| 2011/0304528 A1* | 12/2011 | Murata et al. ................ 345/102 |
| 2012/0075168 A1* | 3/2012 | Osterhout et al. ............... 345/8 |
| 2013/0083080 A1* | 4/2013 | Rappoport et al. .......... 345/690 |

* cited by examiner

*Primary Examiner* — Koosha Sharifi-Tafreshi
(74) *Attorney, Agent, or Firm* — Kokka & Backus, PC

(57) ABSTRACT

A hybrid display system for a device includes a high resolution display and a low resolution display that are positioned relative to each other to display an image having mixed resolution. A single high resolution display having a size of 1.5 cm by 10 cm and a first cost may be replaced by a hybrid display having the same overall size but using a smaller size (e.g., 1.5 cm by 4 cm) and lower cost for the high resolution display. To achieve the remaining 6 cm in display size, the low resolution display may have a size of approximately 1.5 cm by 6 cm and a lower cost than either of the high resolution displays, such that a combined cost of the high and low resolution displays in the hybrid display makes the second cost lower than the first cost. The high and low resolution displays may use different display technologies to achieve cost and size tradeoffs.

16 Claims, 16 Drawing Sheets

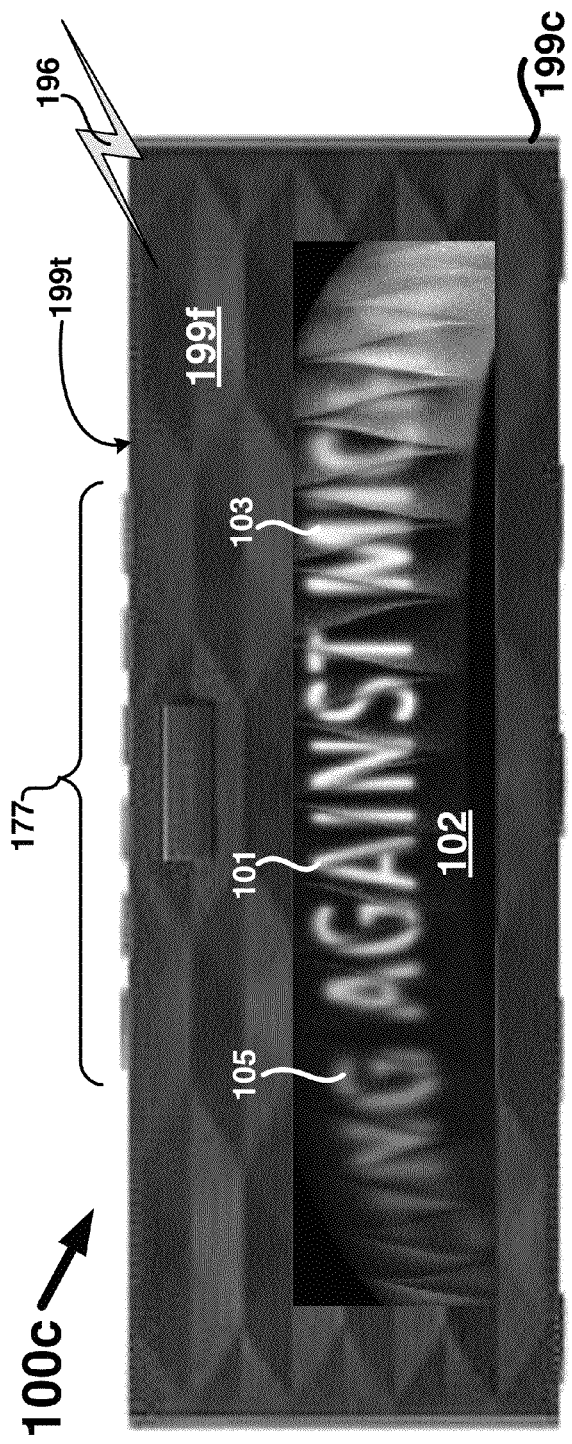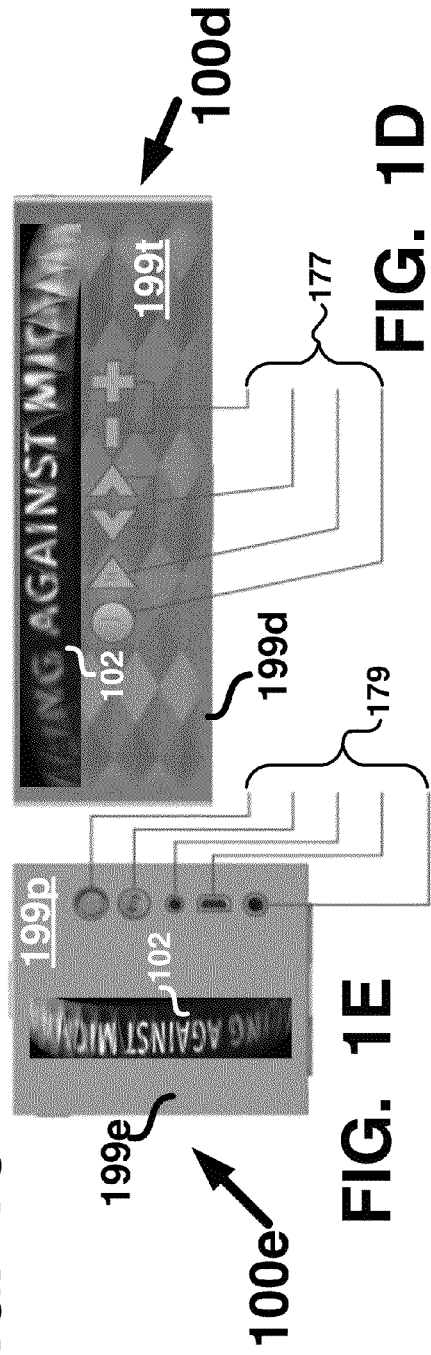

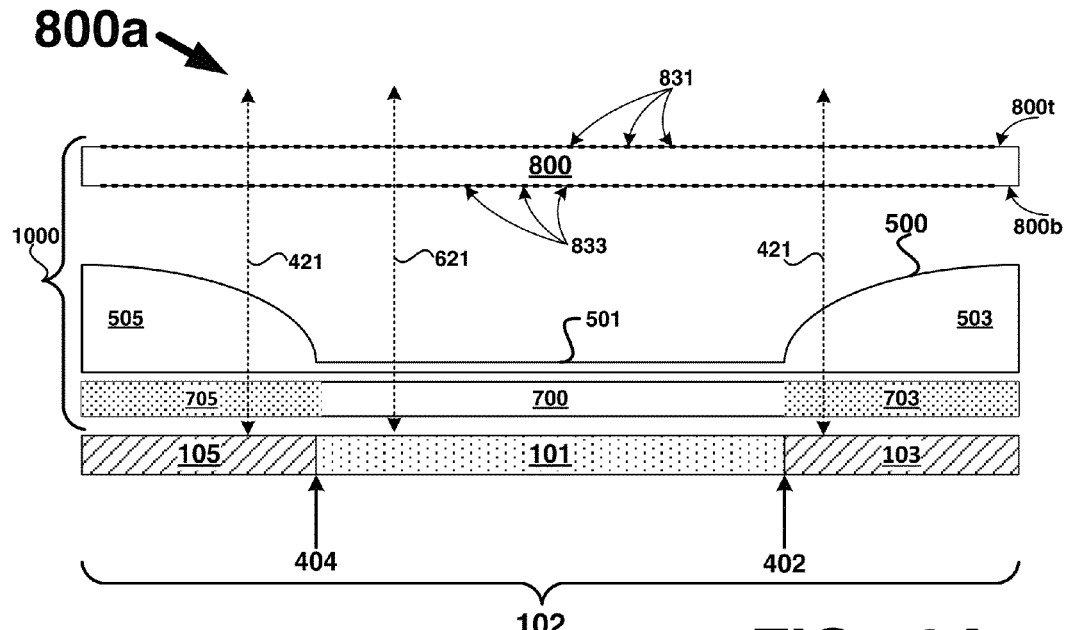
FIG. 8A
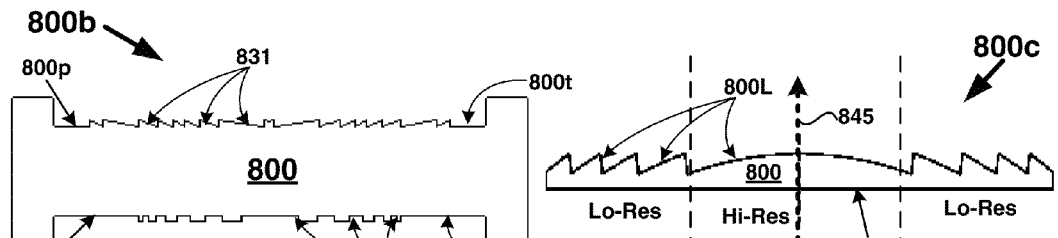
FIG. 8B
FIG. 8C
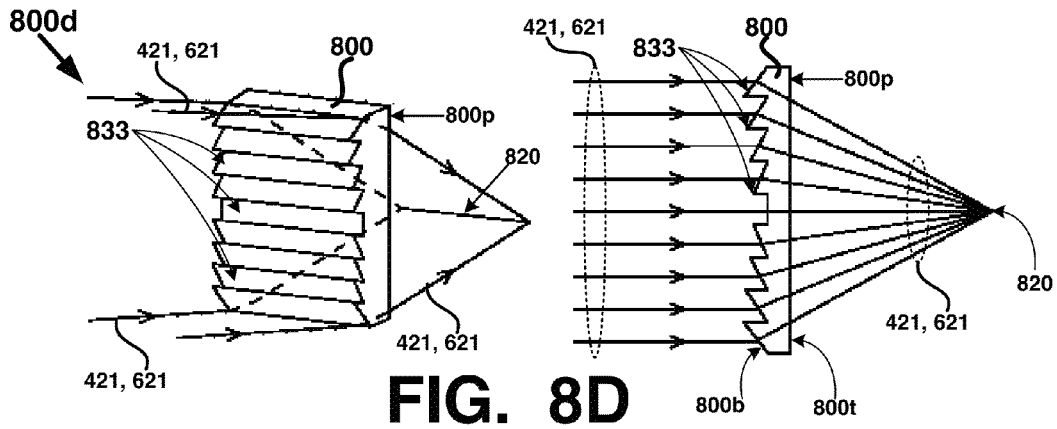
FIG. 8D

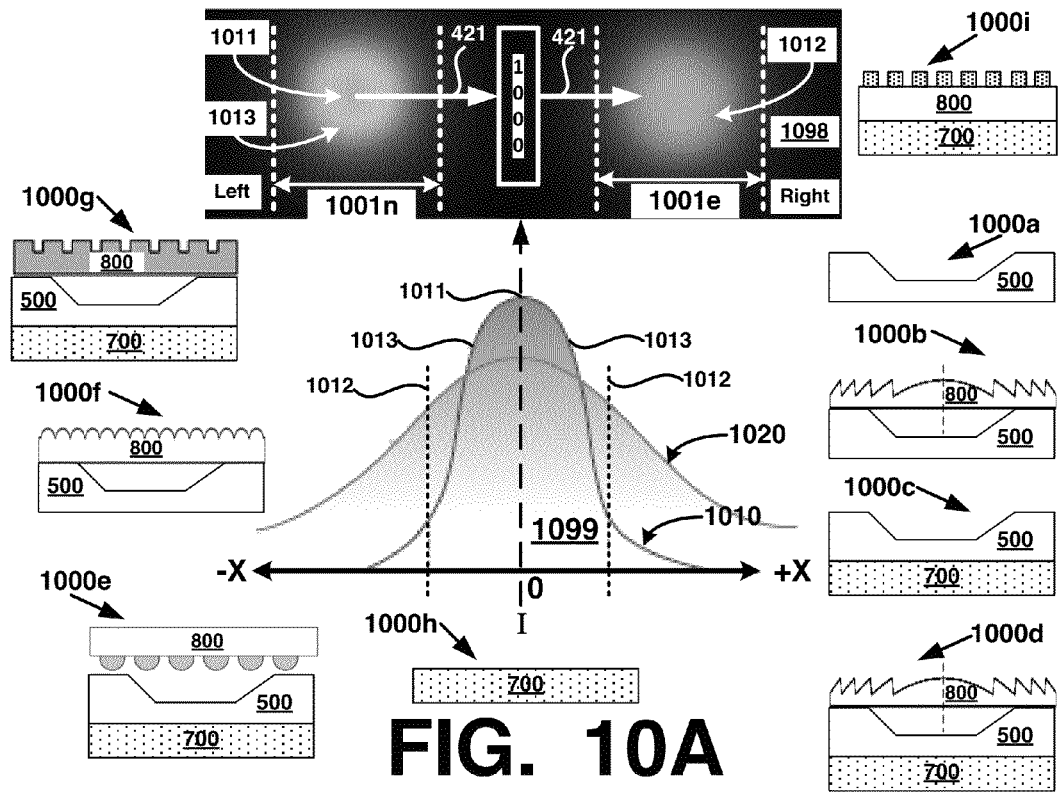
FIG. 10A
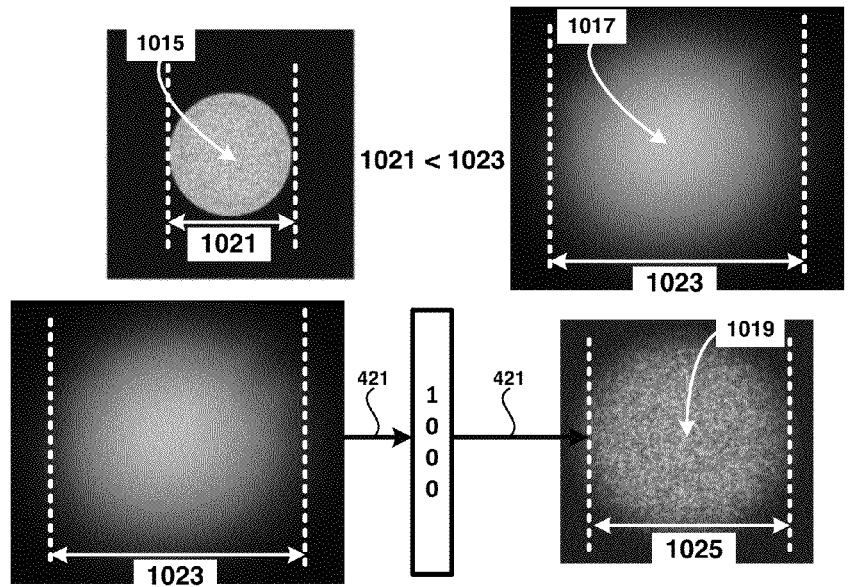
FIG. 10B  (e.g., 1021 < 1025 < 1023)

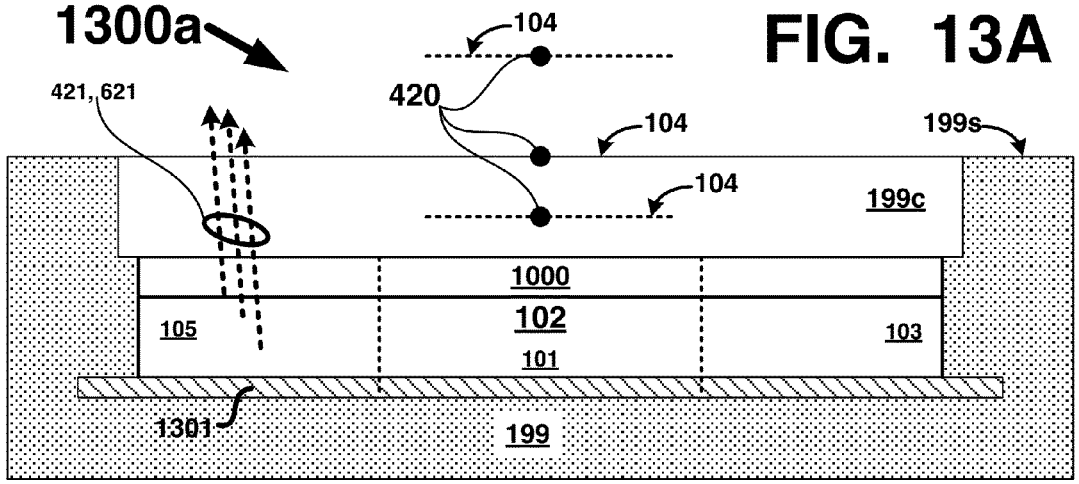
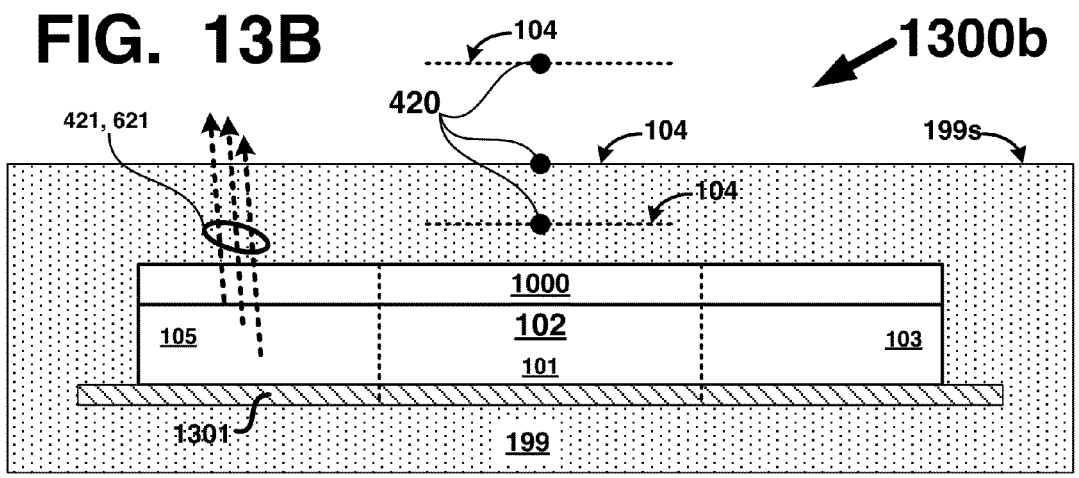
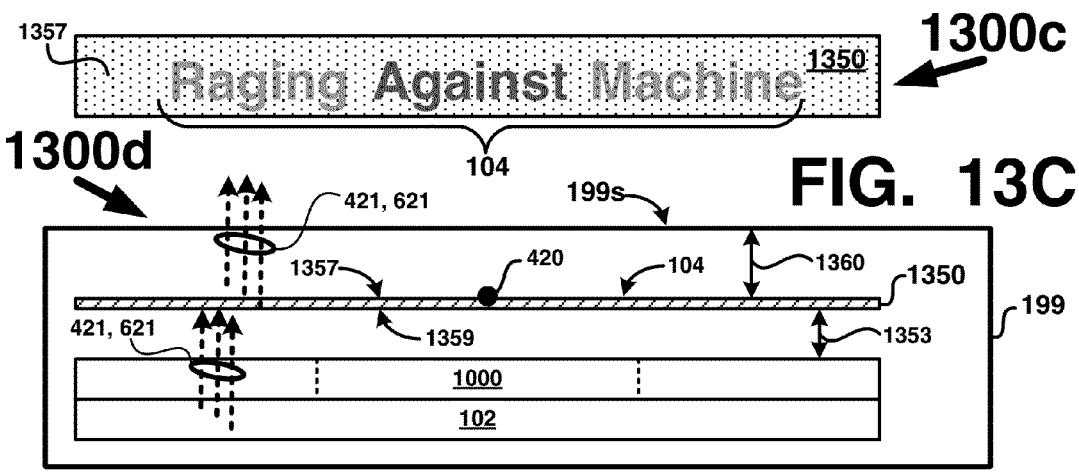
FIG. 13A
FIG. 13B
FIG. 13C

SPARKLE DISPLAY

CROSS-REFERENCE TO RELATED APPLICATIONS

This application is related to the following applications: U.S. patent application Ser. No. 14/073,550, filed on Nov. 6, 2013, and titled "Protective Covering For Wearable Devices"; all of which are hereby incorporated by reference in their entirety for all purposes.

FIELD

The present application relates generally to portable electronics, wearable electronics, consumer electronics, electronic systems, and more specifically to systems, electronics, structures and methods for electronic displays.

BACKGROUND

As more electronic devices include displays that present information, images, icons, text, GUI's, notifications, numerals, and the like, factors such as display size (e.g., length, width, thickness), display resolution (e.g., HD, pixel density, dots per inch—PPI, pixel per inch—PPI, etc.), and display application (e.g., smartphone, smart watch, tablet, PC, laptop, wearable device, HDTV, media device, etc.), may have an impact on cost, form factor, and type of display that may be used in any particular application. In a typical application, a specific display type is selected based on one or more of the above criteria. As an example, some conventional applications will select a backlit LCD type display, an organic light emitting diode display, a plasma display, or other display type. Regardless of the type of display selected, display costs is typically proportional to display size, display resolution or both, as the case may be for devices such as HDTV's, laptops, monitors, smartphones, digital image capture devices, digital media devices, gaming devices, tablets, pads, and a variety of wearable and/or portable electronic devices. In some applications it may be desirable to integrate a large display into a product, but costs associated with the larger display may make it economically impracticable for the intended application. For example, a high-resolution display having an active display area that is 6 inches long by 3 inches high and having a pixel density of 300 pixels per inch (PPI) will cost more than a low-resolution display having an active display area that is also 6 inches long by 3 inches high but having a pixel density of 150 PPI.

Ideally, it may be preferable to for a device to incorporate a large display that meets design goals for the device while at the same time keeping display cost within a design budget so that the device is commercially viable in a marketplace with competing products. Moreover, it may be desirable to make a tradeoff between display resolution and display size so that the size goal for the display is satisfied while the tradeoff in display resolution is minimized as much as possible.

Accordingly, there is a need for hybrid displays, methods and systems that provide larger display sizes and high display resolution.

BRIEF DESCRIPTION OF THE DRAWINGS

Various embodiments or examples ("examples") of the present application are disclosed in the following detailed description and the accompanying drawings. The drawings are not necessarily to scale:

FIGS. 1C-1E depict exemplary front, top, and side plan views of media devices that include a hybrid display, according to an embodiment of the present application;

FIG. 8A depicts one example of a thin-optic for a hybrid display, according to an embodiment of the present application;

FIGS. 8B-8F depict several non-limiting examples of Fresnel thin-optics for a hybrid display, according to an embodiment of the present application;

FIG. 10A depicts several non-limiting examples of an optical stack for a hybrid display, according to an embodiment of the present application;

FIG. 10B depicts examples of diagrams of spot size and beam spread from light emitting elements of a hybrid display, according to an embodiment of the present application;

FIG. 13A depicts a cross-sectional view of one example of chassis including a hybrid display, according to an embodiment of the present application;

FIG. 13B depicts a cross-sectional view of another example of chassis including a hybrid display, according to an embodiment of the present application; and FIG. 13C depicts a cross-sectional view of one example of a chassis including a scrim structure and a hybrid display, according to an embodiment of the present application.

DETAILED DESCRIPTION

Various embodiments or examples may be implemented in numerous ways, including as a system, a process, an apparatus, a user interface, or a series of program instructions on a non-transitory computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying drawing FIGS. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1A:
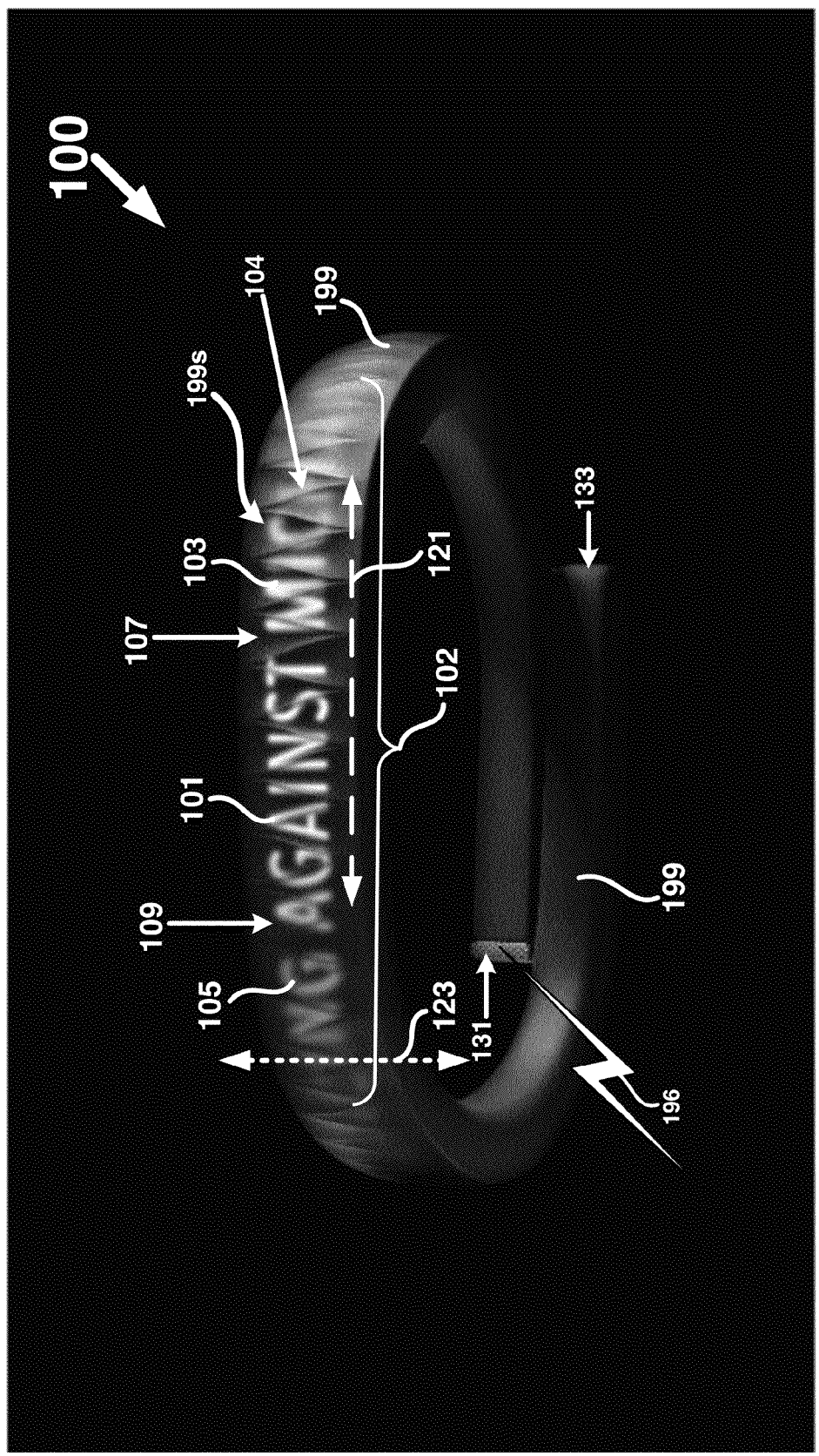
FIGS. 1A-1B depict exemplary top profile views of a wearable device that includes a hybrid display, according to an embodiment of the present application.
Figure 1B:
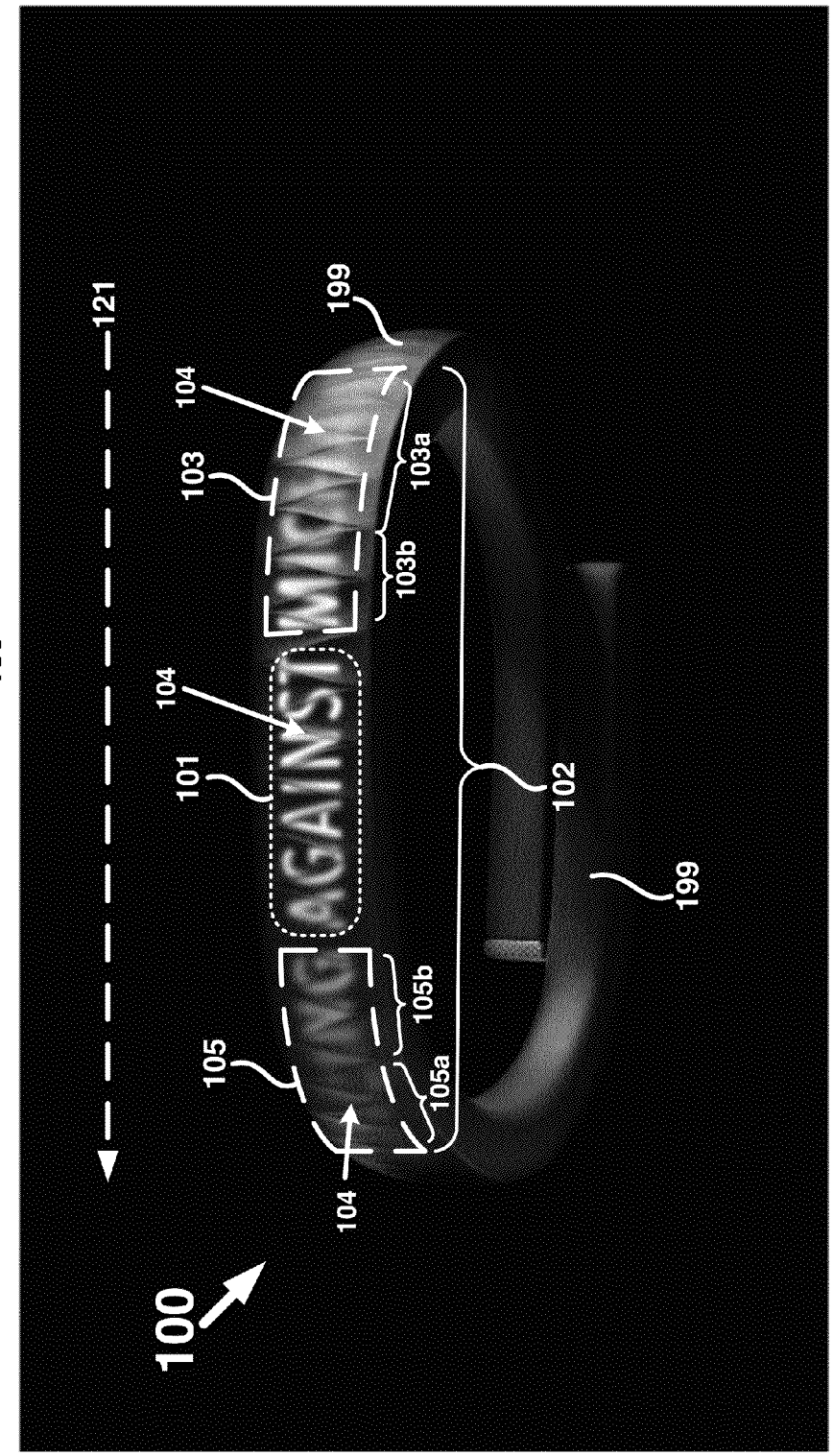

Reference is now made to FIGS. 1A-1B where top profile views of a wearable device 100 including a hybrid display 102 are depicted. In reference to FIG. 1A, the wearable device 100 may include a chassis 199 that may be configured to be removable donned on a body of a user (not shown). Although not depicted in FIG. 1A, chassis 199 may include a substructure that supports electrical systems, sensors, power supplies, hybrid display 102 and other components of wearable device 100. Moreover, chassis 199 and its associated substructure and/or components may be configured to bend, flex, or otherwise change in shape in order to don the wearable device 100 on a portion of the user's body, such as the wrist, arm, leg, ankle, neck, head, torso, etc., for example. Chassis 199 may comprise an outer molding that surrounds interior structure and/or components and may be made from a flexible material that may include an optically transparent portion to allow viewing of hybrid display 102. Alternatively, chassis 199 may be entirely optically transparent. As will be described in greater detail below, hybrid display 102 may span only a portion of a device it is coupled with, or may span an entirety of some portion of the device it is coupled with. In FIG. 1A, hybrid display 102 is depicted as spanning only a portion of wearable device 100; however, hybrid display 102 may have a longer span such as from one end 131 to another end 133 of the wearable device 100. Wearable device 100 or other device or system including the hybrid display 102 may be a wirelessly enabled device configured for wireless communication 196 with other wireless devices (e.g., a wireless client device, wireless router) and wireless systems. Device 100 may include a radio frequency (RF) system having one or more radios configured to wirelessly communicate 196 using one or more wireless protocols (e.g., NFC, Bluetooth®, Bluetooth® Low Energy, Cellular, WiFi, WiMAX, one or more varieties of IEEE 802.11, Ad Hoc WiFi, HackRF, USB-powered software-defined radio (SDR), WAN, etc.). Device 100 may include a port (e.g., a connector) for wired communication (e.g., USB, micro-USB, Ethernet, Lightning, FireWire®, Thunderbolt®, TRS, TRSS, RS-232, etc.) with external devices and systems.

Hybrid display 102 may comprise a plurality of different displays having different resolutions, different types or technologies of light emitting devices and/or pixels (e.g., OLED, discrete LED's, surface mount LED's, LCD, etc.), different pixel pitches, different pixels sizes, different display array sizes, different form factors, different display technologies, different intensities of emitted light output (e.g., from pixels and/or discrete devices), different color of emitted light (e.g., monochromatic, colored, RGB), different fabrication techniques (e.g., discrete pixel displays fabricated on a PC board or flexible PC board, monolithically integrated displays fabricated on a semiconductor substrate), etc., just to name a few. The plurality of different displays in hybrid display 102 may include but is not limited to flexible displays (e.g., that may be curved, arcuate, twisted, etc.), inflexible displays (e.g., substantially planar and/or rigid that may not be bendable, etc.), semi-flexible displays (e.g., may allow for slight bending, curving, flexing, twisting), or some combination of the forgoing.

Light emitting elements as described herein may be interchangeably referred to as a light emitting device, device, or pixel. A pixel or device may be discrete as in a through-hole LED or surface mount LED, or may be monolithically integrated along with other devices or pixels in an array or other structure as in an OLED or LCD display, for example. Surface mount technology (SMT) and/or surface mount devices (SMD) used to implement pixels may have dimensions that are about 0.25 mm (e.g., $\frac{1}{100}$ inch) per side or less (e.g., 0.2 mm×0.1 mm), die sizes (e.g., the semiconductor substrate that emits light) may be about 1.8 mm per side or less (e.g., 1.6 mm×0.8 mm), and thickness (e.g., height) may be about 0.25 mm (e.g., $\frac{1}{100}$ inch) or less. Therefore, display arrays or other structures that include SMD LED's, for example, may have a large number of the devices/pixels per inch or per millimeter. In that the SMD pixels may be positioned relative to one another on a substrate such as a PC board or flexible PC board, a pixel pitch in a row direction and a column direction may be predetermined to define a preferred pixel density in an array or other configuration. Monolithically integrated pixels may also have their pitch and pixel density predetermined and due to micron and/or sub-micron fabrication technologies and processes, pixel size and pixel pitch may be much smaller than for discrete devices, and pixel density may be much higher. Accordingly, differences in display resolution may be tailored to a specific application by using monolithically integrated displays for high resolution and discrete pixel technology for low resolution displays, for example.

Hybrid display 102 may include a high-resolution display 101 and one or more low-resolution displays (103, 105) that may be positioned adjacent to the high-resolution display 101 in a variety of positions including but not limited to a low-resolution display 103 positioned at a first end 107 of high-resolution display 101 and another low-resolution display 105 positioned at a second end 109 of high-resolution display 101. Images 104 presented on hybrid display 102 may include any form that may be displayed including but not limited to text, data, graphics, icons, a GUI, a menu, a cursor, ASCII characters, numbers, graphs, and combinations of the foregoing, just to name a few. Images 104 presented on hybrid display 102 may scroll 121 and/or 123 across display 102 in one or more directions that are not limited to the directions depicted by dashed arrows for 121 and 123 in FIG. 1A.

As will be described in greater detail below optics, structures within chassis 199, positioning of displays 101, 103 and 105 relative to one another or within chassis 199, or other techniques may be used to make image 104 appear (e.g., to an eye of the user and/or an observer) to be positioned on a surface of the device 100 (e.g., a surface 199s of chassis 199), below a surface of device 100 (e.g., below surface 199s of chassis 199) or both above and below a surface of the device 100.

Turning now to FIG. 1B, where images 104 displayed in high-resolution display 101 (denoted in fine dashed line) are presented with greater clarity (e.g., higher image resolution) than images 104 in low resolution displays 103 and 105 lo-res 103 or 105 hereinafter), in which the images 104 may be made to appear (e.g., to the user and/or an observer) to be less well defined, blurry, faded, wavy, of lower intensity, distorted, grainy, differ in font, differ in size, differ in spacing between characters or object, or other effect relative to images 104 displayed on the high-resolution display 101 (hi-res 101 hereinafter). Appearance of the images 104 presented in the lo-res (103, 105) and/or hi-res (101) displays may be varied and/or controlled by one or more factors including by not limited to optics, structures, circuitry, image data or other in device 100.

As images 104 are presented on hybrid display 102, the image 104 may have a different appearance at different portions of the display. For example, in one or both of the lo-res displays (103, 105), the image 104 may appear less defined in portions 103a and 105a and appear more defined in portions 103b and 105b. As one example, if the image 104 to be presented comprises text string 180 "Raging Against Machine" and the text string 180 is scrolled across display 102 in the direction of arrow 121 (e.g., from left to right on the drawing sheet), then those portions of the text string 180 when presented on hi-res display 101 may appear more visually striking (e.g., higher resolution, brightness, etc.) than those portions of the text string 180 when presented on the lo-res displays (103, 105). Moreover, within the lo-res displays (103, 105) portions of the text string 180 that are presented in portions 103a and 105a may appear less visually striking (e.g., less resolution, more distortion, etc.) than portions of the text string 180 that are presented in portions 103b and 105b (e.g., more resolution, less distortion, etc.). In some examples, the image 104 presented at the boundaries between the hi-res display 101 and the lo-res displays 103 and/or 105 may be equally striking (e.g., of identical or nearly identical resolution), such that the intended transition is seamless in regard to images presented on the lo-res (103, 105) and hi-res 101 displays of hybrid display 102. For example, using 402 and 404 (see FIGS. 4A and 5A) as an example boundary between the transitions between lo-res display 103 and hi-res display 101 and hi-res display 101 and lo-res display 103, images (e.g., text, graphics, or other) to the left and right of those boundaries may appear to be of equal or near-equal resolution (e.g., high resolution) to an eye of a user viewing the display 102 or to a machine (e.g., an image capture device) viewing the display 102. The optics, hardware, circuitry, software, or some combination of the foregoing may be used to control resolution of the images presented by the hi and lo res displays (101, 103, 105) at their adjoining boundaries and/or at other positions along hybrid display 102.

Hybrid display 102 may comprise more or fewer lo-res and hi-res displays than depicted in FIGS. 1A and 1B. In some examples, lo-res displays and hi-res displays may be made from different display technologies. In other examples, lo-res displays and hi-res displays may be made from similar display technologies but with different display resolutions. For example, hi-res display 101 may be made using an organic light emitting diode (OLED) technology that may include an array of OLED pixels that are monolithically integrated on a semiconductor substrate that may include display driver circuitry that is fabricated on the substrate. Hi-res display 101 may be fabricated on a flexible substrate, rigid substrate, or semi-flexible substrate. As one example, hi-res display 101 may be a rigid OLED or LCD display. As another example, hi-res display 101 may be a flexible OLED or LCD display. Lo-res display 103, 105 or both may be made from discrete devices, such as discrete light emitting diodes (LED) arranged in an array or other image structure on a substrate such as a flexible or rigid substrate and coupled to the substrate using soldering or some other process. The substrate may be a flexible printed circuit board (FPCB) or a printed circuit board (PCB) that is rigid or semi-flexible, for example. The discrete LED's may be surface mount devices (SMD) that may be soldered to a substrate in an array pattern such as a dot matrix pattern or other pattern that may be application specific. As will be described below, pixel sizes, pixel pitches, display densities, display resolution, display intensity and other attributes of the lo-res and/or high-res displays may be different, may be the same, or may be similar. As one example pixel pitch in the hi-res display 101 may be smaller (e.g., higher pixel density, higher PPI) than the lo-res displays (103, 105). As another example, a pixel size for the hi-res display 101 may be identical to or approximately equal to a pixel size for the lo-res displays (103, 105). Lo-res displays (103, 105) may be identical in some parameters or all parameters.

Attention is now directed to FIGS. 1C-1E where front, top, and side plan views of media devices 100c, 100d and 100e that include the hybrid display 102 are depicted. The non-limiting examples of devices in FIGS. 1A-1E and other are provided to illustrate just some of the electronic systems that may include the hybrid display 102 and the present application is not limited to the examples depicted herein. In FIG. 1C, a wireless media device 100c includes the hybrid display 102 positioned on a front surface 199f of chassis 199a. Wireless media device 100c may wirelessly communicate 196 with external wireless devices and systems. A control group 177 (e.g., of buttons, switches, or the like) positioned on a top surface 199t of chassis 199c may be used to control functions of wireless media device 100c, such as playback of content (e.g., music, streaming content, etc.). Hybrid display 102 may be used to display content being handled by device 100c (e.g., a playlist, title and/or artist of a song being played back, etc.), provide information (e.g., time, date, temperature, news, device status, SMS text, etc.). Images 104 requiring high-resolution display may be presented only on hi-res display 101.

In FIG. 1D, media device 100d includes the hybrid display 102 positioned on top surface 199t of chassis 199d and adjacent to control group 177. In FIG. 1E, media device 100e includes the hybrid display 102 positioned on an end portion 199p of chassis 199e. Here, hybrid display 102 may have a vertical orientation and images 104 may be rotated or otherwise manipulated by hardware, software or both to facilitate presentation in a manner preferred by a user of device 100e or other devices that include hybrid display 102.

Figure 2:
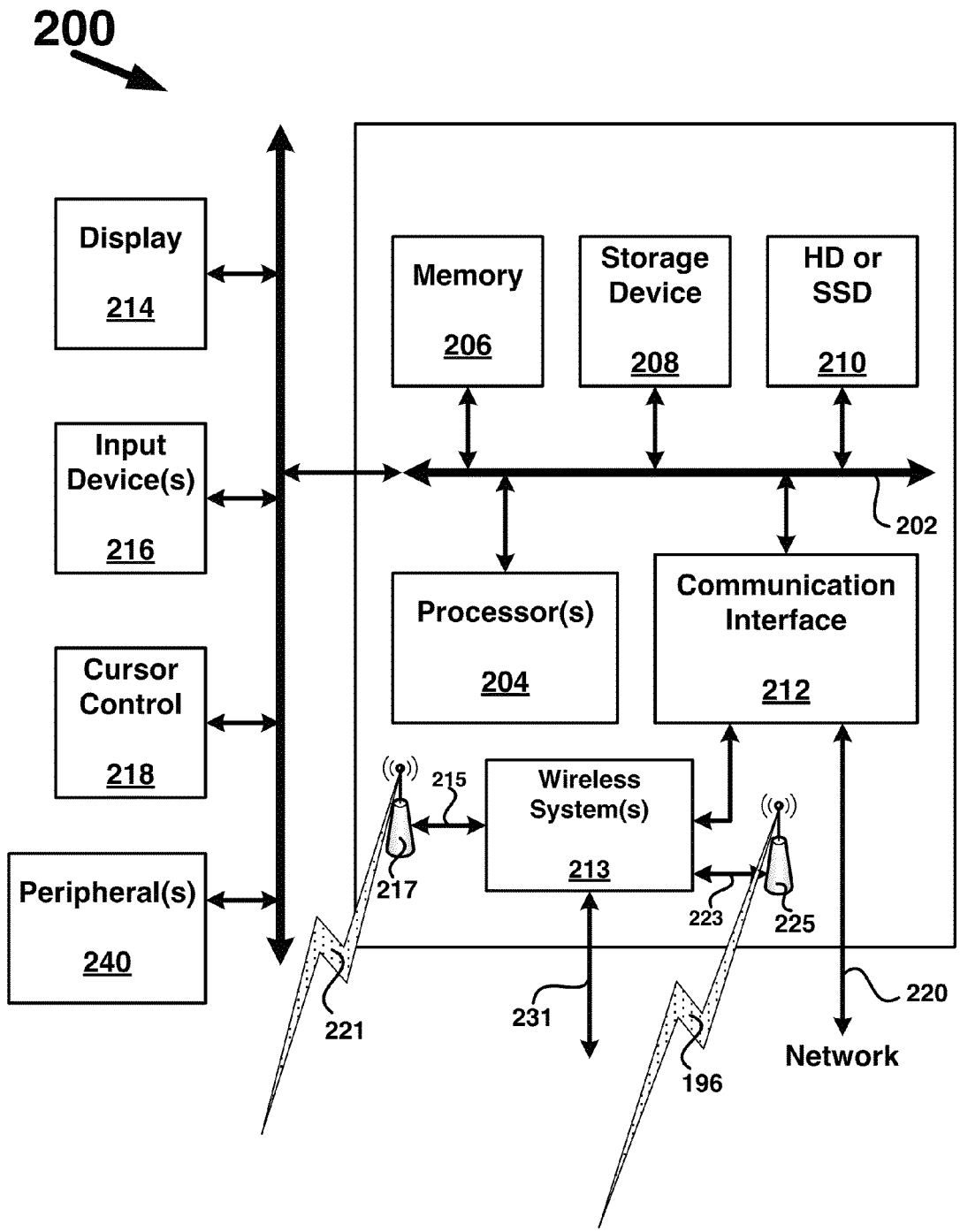
FIG. 2 depicts an exemplary computer system, according to an embodiment of the present application.

FIG. 2 depicts an exemplary computer system 200 suitable for use in the systems, methods, and apparatus described herein that include hybrid display 102. In some examples, computer system 200 may be used to implement circuitry, computer programs, applications (e.g., APP's), configurations (e.g., CFG's), methods, processes, or other hardware and/or software to implement techniques described herein. Computer system 200 includes a bus 202 or other communication mechanism for communicating information, which interconnects subsystems and devices, such as one or more processors 204, system memory 206 (e.g., RAM, SRAM, DRAM, Flash), storage device 208 (e.g., Flash Memory, ROM), disk drive 210 (e.g., magnetic, optical, solid state), communication interface 212 (e.g., modem, Ethernet, one or more varieties of IEEE 802.11, WiFi, WiMAX, WiFi Direct, Bluetooth, Bluetooth Low Energy, NFC, Ad Hoc WiFi, HackRF, USB-powered software-defined radio (SDR), WAN or other), display 214 (e.g., CRT, LCD, OLED, touch screen), one or more input devices 216 (e.g., keyboard, stylus, touch screen display), cursor control 218 (e.g., mouse, trackball, stylus), one or more peripherals 240. Some of the elements depicted in computer system 200 may be optional, such as elements 214-218 and 240, for example and computer system 200 need not include all of the elements depicted.

According to some examples, computer system 200 performs specific operations by processor 204 executing one or more sequences of one or more instructions stored in system memory 206. Such instructions may be read into system memory 206 from another non-transitory computer readable medium, such as storage device 208 or disk drive 210 (e.g., a HD or SSD). In some examples, circuitry may be used in place of or in combination with software instructions for implementation. The term "non-transitory computer readable medium" refers to any tangible medium that participates in providing instructions to processor 204 for execution. Such a medium may take many forms, including but not limited to, non-volatile media and volatile media. Non-volatile media includes, for example, Flash Memory, optical, magnetic, or solid state disks, such as disk drive 210. Volatile media includes dynamic memory (e.g., DRAM), such as system memory 206. Common forms of non-transitory computer readable media includes, for example, floppy disk, flexible disk, hard disk, Flash Memory, SSD, magnetic tape, any other magnetic medium, CD-ROM, DVD-ROM, Blu-Ray ROM, USB thumb drive, SD Card, any other optical medium, punch cards, paper tape, any other physical medium with patterns of holes, RAM, PROM, EPROM, FLASH-EPROM, any other memory chip or cartridge, or any other medium from which a computer may read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 202 for transmitting a computer data signal. In some examples, execution of the sequences of instructions may be performed by a single computer system 200. According to some examples, two or more computer systems 200 coupled by communication link 220 (e.g., LAN, Ethernet, PSTN, wireless network, WiFi, WiMAX, Bluetooth (BT), NFC, Ad Hoc WiFi, HackRF, USB-powered software-defined radio (SDR), or other) may perform the sequence of instructions in coordination with one another. Computer system 200 may transmit and receive messages, data, and instructions, including programs, (e.g., application code), through communication link 220 and communication interface 212. Received program code may be executed by processor 204 as it is received, and/or stored in a drive unit 210 (e.g., a SSD or HD) or other non-volatile storage for later execution. Computer system 200 may optionally include one or more wireless systems 213 in communication with the communication interface 212 and coupled (215, 223) with one or more antennas (217, 225) for receiving and/or transmitting RF signals (221, 196), such as from a WiFi network, BT radio, or other wireless network and/or wireless devices, devices 100, 100c, 100d, 100e, for example. Examples of wireless devices include but are not limited to: a data capable strap band, wristband, wristwatch, digital watch, or wireless activity monitoring and reporting device; a smartphone; cellular phone; tablet; tablet computer; pad device (e.g., an iPad); touch screen device; touch screen computer; laptop computer; personal computer; server; personal digital assistant (PDA); portable gaming device; a mobile electronic device; and a wireless media device, just to name a few. Computer system 200 in part or whole may be used to implement one or more systems, devices, or methods that communicate with device 100 via RF signals (e.g., 196) or a hard wired connection (e.g., data port). For example, a radio (e.g., a RF receiver) in wireless system(s) 213 may receive transmitted RF signals (e.g., 196 or other RF signals) from device 100 that include one or more datum (e.g., sensor system information, content, data, or other). Computer system 200 in part or whole may be used to implement a remote server or other compute engine in communication with systems, devices, or method for use with the device 100 or other devices as described herein. Computer system 200 in part or whole may be included in a portable device such as a smartphone, tablet, or pad.

Figure 3A:
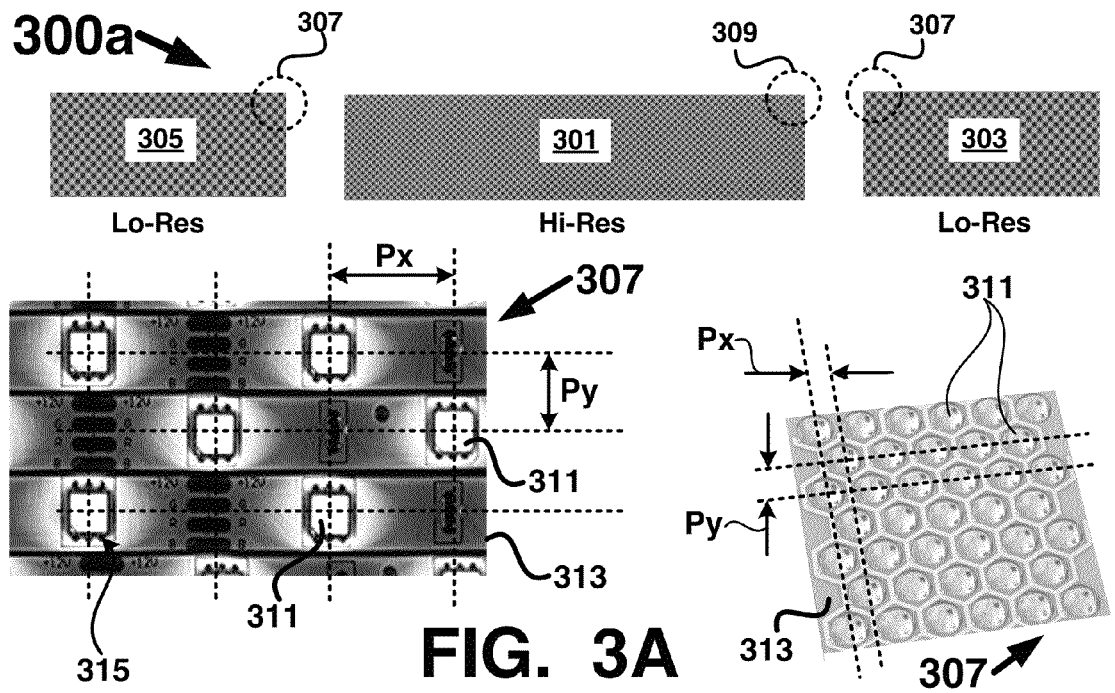
FIG. 3A depicts top plan views of exemplary low resolution and high resolution displays that may be incorporated into a hybrid display, as well as enlarged views of exemplary low resolution displays, according to an embodiment of the present application.

FIG. 3A depicts top plan views 300a of exemplary low resolution (303, 305) and high resolution 301 displays that may be incorporated into the hybrid display 102, as well as enlarged views (307) of exemplary low resolution displays (303, 305). Hybrid display 102 may be comprised of one or more lo-res display (e.g., 303 and/or 305) and one or more hi-res displays 301. The display technology used to implement the lo-res and hi-res displays may include but is not limited to light emitting diode (LED), colored or multi-color LED (e.g., RGB LED's), organic light emitting diode (OLED), active matrix OLED (AMOLED), passive matrix OLED (PMOLED), colored or multi-color OLED (e.g., RGB OLED's), monochrome OLED, one or more varieties of liquid crystal display (LCD), LED backlit and/or side lit LCD's, transmissive and/or reflective LCD's, gas discharge displays, plasma displays, etc., just to name a few. In some applications, the hi-res display may be the most costly (e.g., parts cost, manufacturing cost, etc.) of the displays with the lo-res displays being of lower cost (e.g., OLED for the hi-res and LED for the lo-res). The hi-res and/or lo-res displays may be laid out and/or arranged in regular patterns such as an array or other orderly structure. The hi-res and/or lo-res displays may be monolithically integrated devices in much the same manner as integrated circuits (IC's) and/or application specific integrated circuits (ASIC's) and may be fabricated on the same substrate (e.g., a semiconductor substrate) as circuitry used for driving and/or interfacing the display with other electrical systems. The hi-res and/or lo-res displays may be discrete devices (e.g., surface mount LED's) that are arranged on a substrate (e.g., a flexible circuit board or flexible printed circuit board (FPCB)) that includes other discrete devices (e.g., arranged in an array) to form the display.

In some examples, a size of the active light emitting element (e.g., LED die or OLED layers) may be different for the lo-res and hi-res displays and may vary among lo-res displays and/or among hi-res displays. For example, a semiconductor die that forms the active light emitting element for a LED may be larger in size than the active element for an OLED or a LCD hi-res display. Moreover, a pixel size and/or pixel pitch may vary between the lo-res and hi-res displays and may vary among lo-res displays and/or among hi-res displays. Pixel density may vary between lo-res and hi-res displays and pixel density may vary between lo-res displays and/or between hi-res displays. For example, lo-res display 303 may have smaller active light emitting elements (e.g., LED die) that lo-res display 305. As another example, hi-res display 301 may have smaller active light emitting elements (e.g., OLED pixels) than either of the lo-res displays (303, 305). As yet another example, lo-res display 303 may have a pixel density of 150 PPI, lo-res display 305 may have a pixel density of 120 PPI, and hi-res display 301 may have a pixel density of 360 PPI.

In FIG. 3A, hi-res 301 and lo-res (303, 305) displays may have any shape and are not limited to the rectangular shape depicted for purposes of explanation only. Hi-res 301 and lo-res (303, 305) displays may be arranged relative to one another in a variety of configurations, such as lo-res displays (303, 305) positioned adjacent to the right and left ends of hi-res display 301; however, the present application is not limited to any specific arrangement of the lo-res and hi-res displays and actual configurations may be application specific.

Now, in FIG. 3A, dashed circles 307 and 309 are presented to highlight examples of possible configurations for the light emitting elements of the hi-res 301 and lo-res (303, 305) displays which will be depicted in greater detail in enlarged views for 307 and 309. On a left side of FIG. 3A, enlarged view 307 of lo-res displays 303 and/or 305 may comprise a substrate 313 (e.g., PCB or FPCB) having a plurality of light emitting elements 311 mounted to the substrate (e.g., by soldering) and electrically coupled 315 with conductive traces, wires, or the like that may be couple with driver circuitry (not shown). As depicted the elements 311 (e.g., discrete SMD LED's) may be arranged in an orderly and regular pattern such as an array; however, the present application is not limited to the arrangement depicted. Here, elements 311 may be spaced apart from one another by a pitch spacing (e.g., from a center point of each element 311) denoted by Px for a spacing along a horizontal X-axis and Py for a spacing along a vertical Y-axis, for example. Px and/or Py may be 2 mm or less, for example. In some examples, Px and Py may be identical (e.g., Px=Py) and in other examples Px and Py may be different (e.g., Px # Py). Elements 311 (pixels hereinafter) may have any size appropriate for the application. For example, pixels 311 may be 0.2 mm×0.1 mm in size or smaller (see 311 in FIG. 12). Pixels 311 may be surface mount discrete LED's that are soldered to electrically conductive pads on a PCB or on a flexible PCB. Here, each pixel 311 is surrounded by four directly adjacent pixels 311 on substrate 313.

On the right side of FIG. 3A another example of lo-res display (303, 305) depicts in enlarged view 307, an alternative arrangement of the pixels 311 arranged in an array having a honeycomb like pattern, with each pixel 321 surrounded by six directly adjacent pixels 321. Circuitry for driving image data to lo-res display (303, 305) may be positioned below substrate 313, at a periphery of substrate 313, on top of substrate 313 along with pixels 311, may be disposed external to substrate 313, or some combination of the foregoing. In some applications lo-res display (303, 305) may be monolithically integrated devices as described above.

Figure 3B:
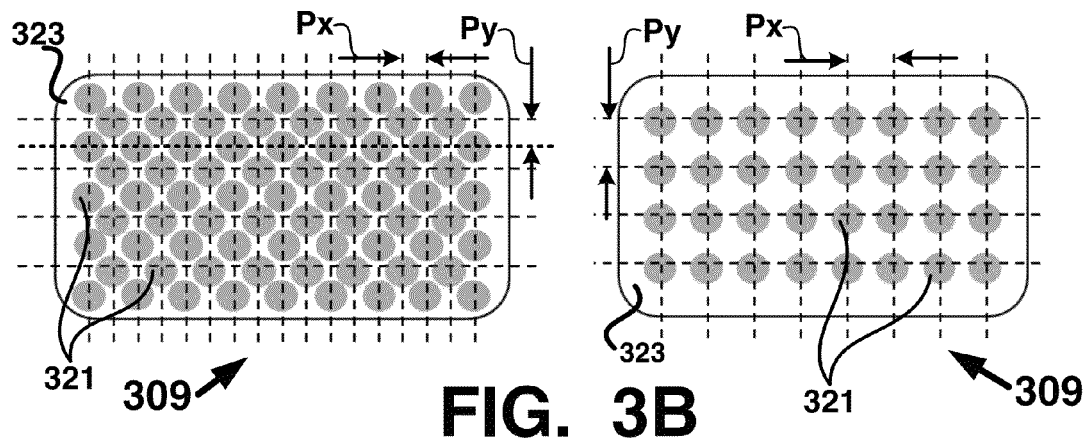
FIG. 3B depicts top plan views of exemplary high resolution displays, according to an embodiment of the present application.

Moving down to FIG. 3B, top plan views of exemplary high resolution displays are depicted in enlarged view of 309. On a left side of FIG. 3B the hi-res display 301 may comprise an array of pixels 321 that may be arranged in an array or other orderly pattern. Here, each pixel 321 is surrounded by four directly adjacent pixels 321. Pixels 321 may be discrete light emitting devices or may be monolithically fabricated on substrate 323 (e.g., a semiconductor wafer, die, substrate), for example. Pixels 321 may be spaced apart from adjacent pixels 321 by pixel pitches Px and Py as described above. Pixel pitches Px and Py for hi-res display 301 may be the same as, different than, or approximately equal to the pixel pitches Px and Py for lo-res displays (303, 305). In some applications, hi-res display 301 may be fabricated using micron or submicron microelectronics fabrications processes and therefore may have pixel pitches Px and Py that are smaller than the pixel pitches Px and Py of lo-res displays (303, 305). On a right side of FIG. 3B another example of hi-res display 301 is depicted in enlarged view 309 where each pixel 321 is surrounded by eight directly adjacent pixels 321 in a regular row-column array configuration.

Figure 3C:
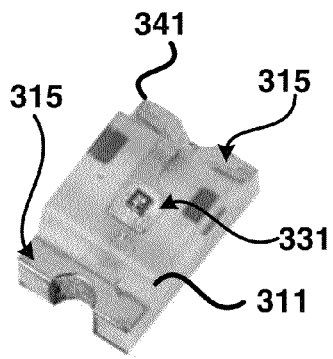
FIG. 3C depicts a profile view of one example of a light emitting device for a hybrid display, according to an embodiment of the present application.

In FIG. 3C a profile view of one example of a light emitting device 311 for the lo-res display (303, 305) of the hybrid display 102 is depicted. Device 311 may be a pixel in one of the enlarged views 307 shown in FIG. 3A. Device 311 may be a SMD LED having a semiconductor die 331 disposed in a surface mount package 341 having electrically conductive structures (e.g., pads) configured to electrically couple with electrically conductive structures on substrate 313.

Figure 3D:
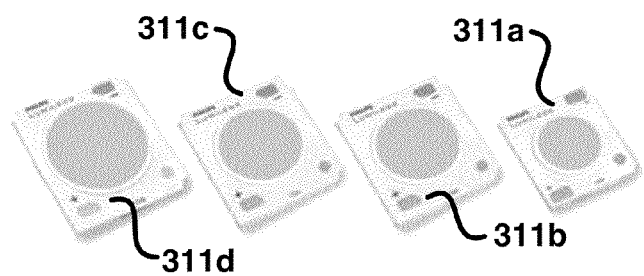
FIG. 3D depicts profile views of other examples of light emitting devices for a hybrid display, according to an embodiment of the present application.

FIG. 3D depicts profile views of other examples of light emitting devices 311a, 311b, 311c, and 311d for lo-res display (303, 305) that may have different sizes (e.g., different pixel sizes). Pixel sizes in lo-res display (303, 305) may vary within a lo-res display (e.g., in 303 or in 305) or between lo-res displays (303, 305). In FIG. 3D, pixel sizes from smallest to largest are ordered as: 311a; 311b; 311c; and 311d. For example, from FIG. 3B, lo-res display 303 may have different pixels sizes 311a and 311c, where 311c is a larger pixel size than 311a. As another example, lo-res display 303 may include pixel size 311b and lo-res display 305 may include pixel size 311d, where 311d is larger than 311b. Pixel sizes in lo-res display (303, 305) may vary in parameters other than size including but not limited to wavelength of emitted light, intensity of emitted light, beam pattern of emitted light, and type of light emitting device, just to name a few. Pixel sizes in lo-res display (303, 305) may be arranged in a dot matrix array configuration or some other configuration.

Figure 4A:
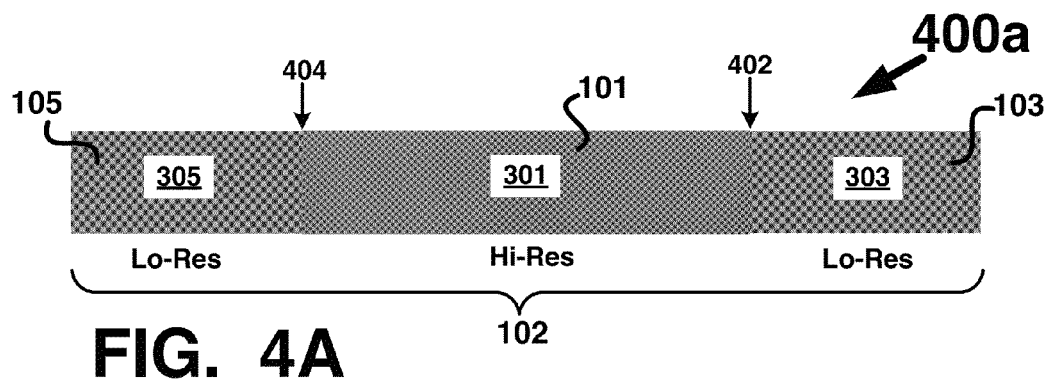
FIG. 4A depicts a top plan view of one example of a hybrid display, according to an embodiment of the present application.

Referring now to FIG. 4A where a top plan view of one example of a hybrid display 102 includes hi-res display 101 and lo-res displays (103, 105) positioned at a first edge 402 and a second edge 404, respectively. As will be described below, relative position of the hi-res 101 and lo-res displays (103, 105) will be application dependent and the displays (103, 105) need not be abutted or otherwise in contact with first and second edges 402 and 404. In some applications, lo-res displays (103, 105) may be positioned above or below the hi-res display. Although hi-res display 101 and lo-res displays (103, 105) are depicted as being planar in FIG. 4A the actual profile of the hi-res display 101 and lo-res displays (103, 105) is not limited to the configurations depicted herein. For example, the hi-res display 101 and/or lo-res displays (103, 105) may have an arcuate shape or other non-planar shape, and in some applications, the hi-res display 101 and/or lo-res displays (103, 105) may be flexible, ridged, or semi-flexible.

Figure 4B:
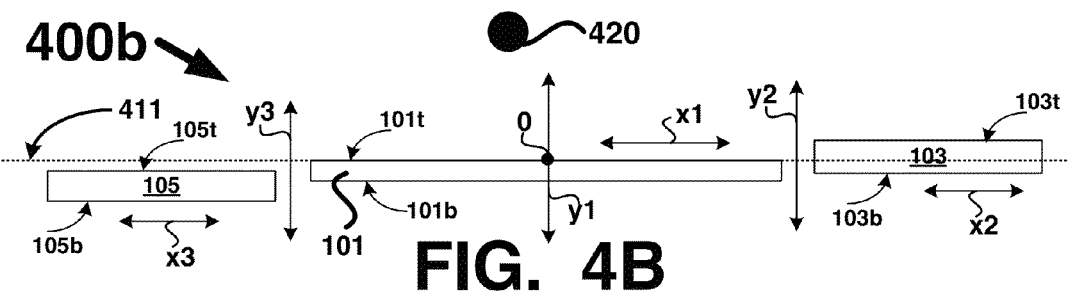
FIG. 4B depicts one example of a cross-sectional view of a hybrid display and example variations in relative positioning between low resolution and high resolution displays, according to an embodiment of the present application.

In FIG. 4B, a dashed line 411 is depicted to illustrate for purposes of explanation, examples of how the hi-res display 101 and/or lo-res displays (103, 105) may be positioned relative to one another, using dashed line 411 as a reference plane or reference point. Here, the reference point 411 is coplanar with a top surface 101t (e.g., a surface from which emitted light exits display 101) of hi-res display 101. Displays 101, 103, and 105 may have top and bottom surfaces 101t, 101b, 103t, 103b, 105t and 105b and those surfaces may not be planar and/or parallel to each other as depicted (e.g., those surfaces may be arcuate or have complex or non-linear profiles). A point zero (0) indicates for purposes of illustration an origin of a X-Y coordinate system that reference point 411 passes through along an x-axis direction and y-axis y1 passes through origin 0 and is perpendicular to reference point 411 (e.g. perpendicular to x-axis direction x1). Lo-res displays (103, 105) may have their relative positions adjusted up or down (e.g., along y-axes y2, y3) and/or left or right (e.g., along x-axes x2, x3) relative to hi-res display 101. In that positions are relative, hi-res display 101 may be positioned up or down along y-axis direction y1 or left or right along x-axis direction x1 relative to the lo-res displays (103, 105).

As will be discussed below, the relative positions of the displays (101, 103, 105) relative to one another may be determined by optical properties, such as beam spread, beam spot size, light intensity, light fall off, or others. For example, light emitting devices in the lo-res display(s) (103, 105) may have a larger spot size than the light emitting devices in the hi-res display 101. It may be desirable for the spot size to be approximately equal at some distance 420 above the hybrid display 102. For example, distance 420 may be a focal point where images from the hybrid display are to be viewed at or it may be some position on, inside, or outside of chassis 199. Optics positioned above the hybrid display 102 and/or position of the lo-res displays (103, 105) may be used to alter the spot size (e.g., by moving lo-res displays closer to 420). As described above, the displays 101, 103, 105 may be planar, arcuate or some other non-linear or non-planar configuration; nevertheless, a relative positioning of the displays 101, 103, 105 may be used to obtain desired display performance (e.g., resolution, brightness, spot size, etc.). In other examples, a portion of the chassis 199 may include a point of focus for the image 104 presented by displays (101, 103, 105), such as a diffuse portion of the chassis 199 and/or some structure positioned in the chassis 199 and above hybrid display 102, such as described below in regards to FIGS. 13A-13C. A diffuse region, volume, area, or structure may be formed in the chassis 199 as part of a fabrication step, such as molding or otherwise forming the chassis 199 around components and the hybrid display 102 and its associated electronics and optics, for example. As one example, a diffuse structure may be formed by a 2K molding process in which the chassis 199 includes an optically transparent window or aperture through which light from hybrid display 102 may be viewed externally by an observer. A material having light diffusion properties may be selected for the 2K molding process to form the diffuse structure.

Figure 4C:
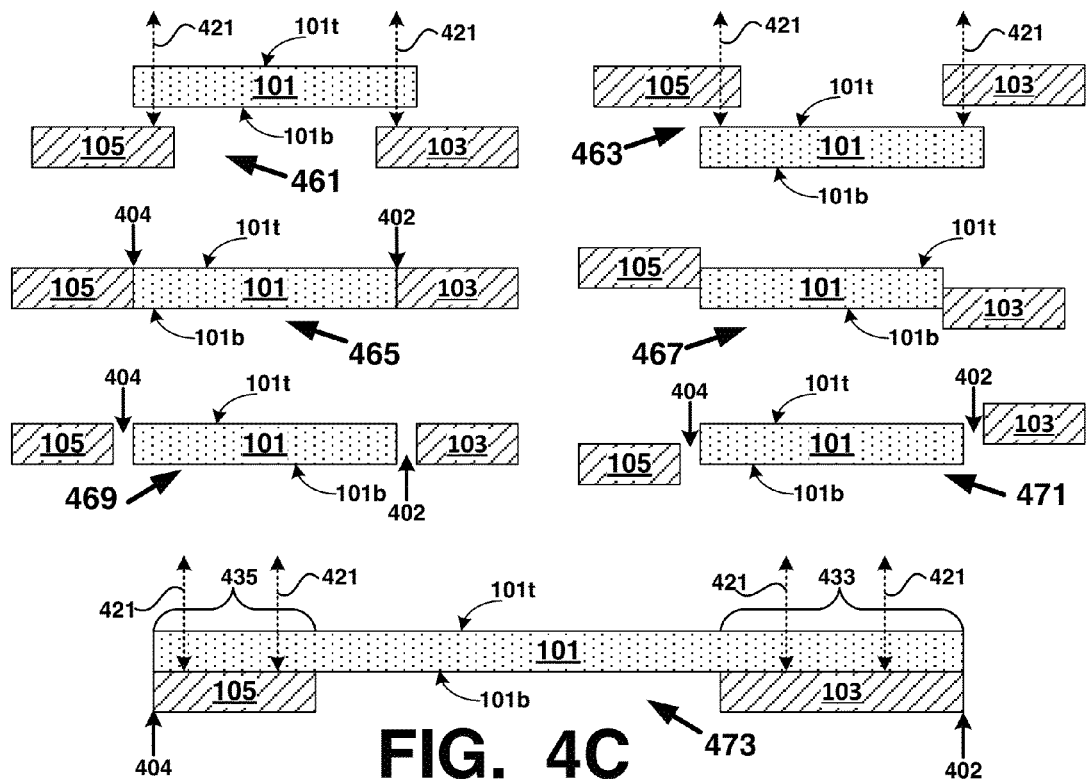
FIG. 4C depicts several examples of configurations of a hybrid display, according to an embodiment of the present application.

FIG. 4C depicts several non-limiting examples 461, 463, 465, 467, 469, 471, and 473 of different configurations of the hybrid display 102. In some examples, at least a portion of one or more of the displays 101, 103, 105 may be optically transparent light (e.g., light emitted by one or more of the displays 101, 103, 105) as denoted by dashed arrow 421. In example 461, at least a portion of lo-res displays 103 and 105 are positioned below and underneath hi-res display 101, optionally, display 101 may include an optically transparent portion (e.g., a glass substrate or other optically transparent material) and light 421 emitted by display 103 and/or 105 may pass through the optically transparent portion. In example 461 at least a portion of the lo-res displays 103 and 105 may be in contact (not shown) with hi-res display 101. In example 463, at least a portion of lo-res displays 103 and 105 are positioned above and over hi-res display 101, optionally, display 103 and/or 105 may include an optically transparent portion (e.g., a glass substrate or other optically transparent material) and light 421 emitted by display 101 may pass through the optically transparent portion. In example 463 at least a portion of the lo-res displays 103 and 105 may be in contact (not shown) with hi-res display 101.

In example 465 the lo-res displays 103 and 105 are positioned adjacent to side portions (e.g., 402, 404) of the hi-res display 101 and the displays 101, 103, and 105 may not be co-planar as depicted (e.g., their upper or top surfaces aligned along the same plane). In example 465, the lo-res displays 103 and/or 105 may not be in direct contact with the side portions of hi-res display 101 as is depicted in example 469. In example 467 the lo-res displays 103 and 105 are positioned adjacent to side portions (e.g., 402, 404) of the hi-res display 101 with display 105 positioned higher and display 103 positioned lower (e.g., above reference point 411) than display 101 and the lo-res displays 103 and/or 105 may not be in direct contact with the side portions of hi-res display 101 as is depicted in example 471. In example 473 an entirety of the lo-res displays 103 and 105 are positioned beneath the hi-res display 101 and light 421 from 103 and 105 may pass through an optically transparent portion (433, 435) of display 101 as described above. In example 473 displays 103 and 105 may not be in contact with display 101 (e.g., in contact with bottom surface 101b). There may be more or fewer displays than depicted in examples of FIG. 4C. Hybrid display 102 may comprise one or more combinations of the examples of different configuration 461, 463, 465, 467, 469, 471, and 473 depicted in FIG. 4C.

Figure 5A:
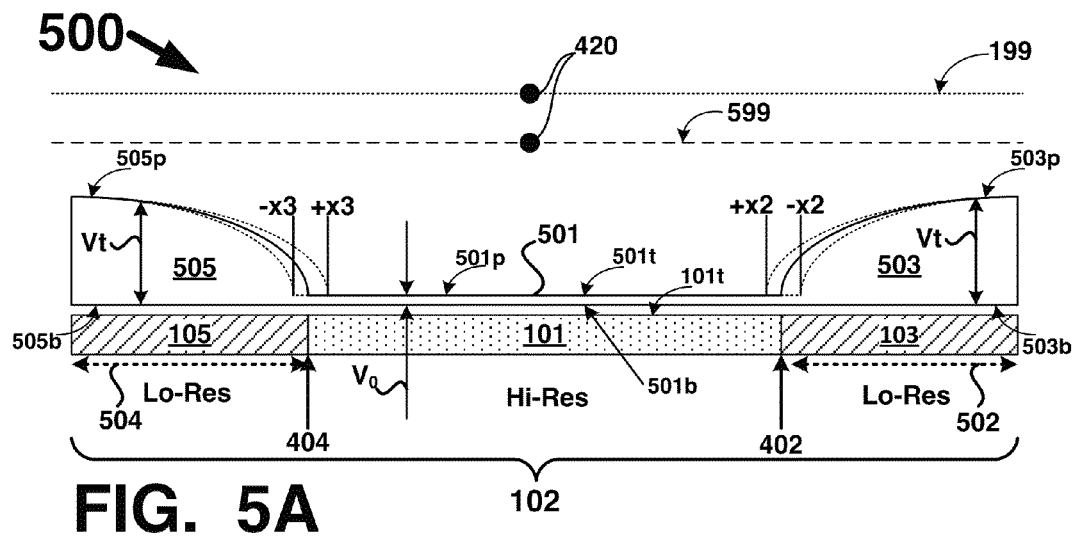
FIG. 5A depicts one example of a diffuser for a hybrid display, according to an embodiment of the present application.

Turning now to FIG. 5A one example of a diffuser 500 for a hybrid display 102 is depicted in cross-sectional view. Diffuser 500 may include separate optical sections configured to modify optical properties of the hi-res 101 and/or lo-res (103, 105) displays. Section 501 may be configured to alter optical properties of light (e.g., 621 of FIGS. 6A-6B) emitted by hi-res display 101 or may be configured to have no effect on light emitted by hi-res display 101. For example, section 501 may be a very thin layer of material having a uniform thickness $V_0$ that does not vary over a length of the section 501. In some applications diffuser 500 may be an integrated optical unit that includes optical sections 503 and/or 505 for the lo-res displays (103, 105) and section 501 may merely over span the hi-res display 101 and may be operative to allow sections 503 and/or 505 to be accurately positioned relative to their respective lo-res displays (103, 105). Diffuser 500 may be positioned over hybrid display 102 with its various optical sections (501, 503, 505) aligned with their respective displays. Diffuser 500 may be in contact with one or more portion of hybrid display 102 or may be positioned over but not in contact with hybrid display 102. As will be described below diffuser 500 may be included in an optical stack 1000 having other optical elements positioned above and/or below diffuser 500.

Figure 5B:
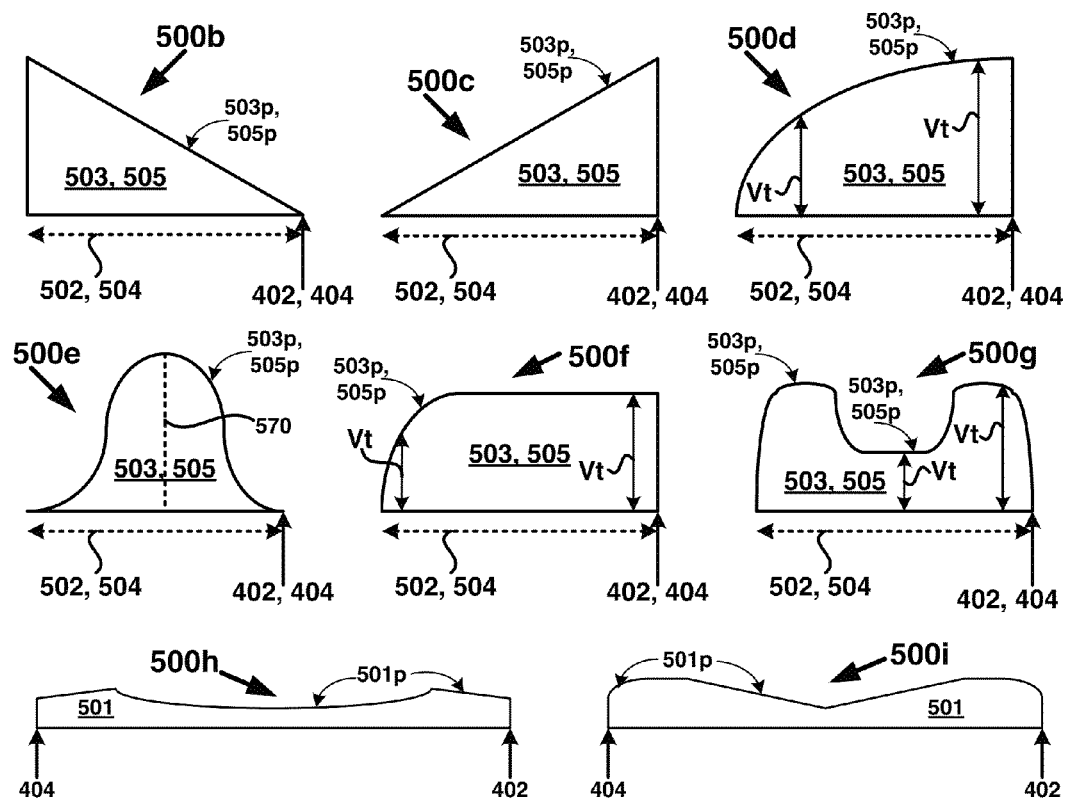
FIG. 5B depicts several non-limiting examples of configurations for a diffuser for a hybrid display, according to an embodiment of the present application.

Optical sections 503 and/or 505 may be positioned in alignment with their respective lo-res displays (103, 105) and may have a thickness $V_t$ that varies along a span 502 and 504 such that the sections 503 and/or 505 may have a profile 503p and 505p that varies across the span as will be described below in regard to FIG. 5B. Thickness $V_t$ associated with profiles 503p and/or 505p may vary according to variations in the profiles (503p, 505p) which themselves may include linear, non-linear, and complex profiles as depicted in FIG. 5B. In FIG. 5A, profiles (503p, 505p) vary along spans 502 and 504. Here, a reference point for purposes of explanation may comprise points 402 and 404 which may represent a junction, joint, or spacing between the hi-res and lo-res displays 101, 103, 105. For example, profiles (503p, 505p) vary (e.g., $V_t$ increases from 402 and 404 in an outward direction such that $V_t$ is thinnest at points 402 and 404 and increases in thickness in a direction away from points 402 and 404. Points 402 and 404 may represent a junction where lo-res displays (103, 105) abut in contact with hi-res display 101 or some other point, such as a gap between edges or endpoints of the lo-res and hi-res displays (see examples of points 402 and 404 in FIG. 4C) when the displays (101, 103, 105) are positioned adjacent to one another but not necessarily in contact with one another. Optical section 503 of diffuser 500 includes an arcuate profile 503p that varies along dashed line 502, and optical section 505 of diffuser 500 includes an arcuate profile 505p that varies along dashed line 504. The profiles and other parameters for optical sections 503 and 505 may be identical or different. In some examples, a lo-res display (e.g., 103 or 105) may not have an associated optical section, that is, if there are two lo-res displays, then only one of the two may have an associate optical section in diffuser 500.

Optical section 503 and/or 505 may begin at points 402 and 404 respectively or may being at some plus or minus offset relative to points 404 and/or 404 as denoted by +X2, −X2 for 503 and +X3 and −X3 for 505. Those offsets may be used to alter optical characteristics of the hybrid display 102. For example, if profiles for optical sections 503 and/or 505 begin at −X2 or −X3, then light from pixels positioned approximate the end of lo-res displays (103, 105) may be not be affected by optical sections (503, 505). As another example, if profiles for optical sections 503 and/or 505 begin at +X2 or +X3, then light from pixels positioned approximate the end of hi-res display 101 may be affected by optical sections (503, 505). Adjusting where the profiles (503p, 505p) begin may be used for a variety of purposes including but not limited to matching beam patterns between lo-res and hi-res pixels, altering pixel spot sizes, altering pixel beam profiles, affect pixel beam spreading, attenuate light output from pixels, create or reduce optical distortion in light from pixels, filter light from pixels, change color of light from pixel, and define the image 104 presented by hybrid display 102, just to name a few.

Moving on to FIG. 5B where several non-limiting examples of configurations for the diffuser 500 for the hybrid display 102 are depicted. In example 500b, optical sections (503, 505) may include a linearly sloped profile (503p, 505p) that increases in thickness in a direction (502, 504) away from points (402, 404); whereas, in example 500c, linearly sloped profile (503p, 505p) decreases in thickness in a direction (502, 504) away from points (402, 404). In example 500d, optical sections (503, 505) may include a non-linear (e.g., arcuate) sloped profile (503p, 505p) that decreases in thickness in a direction (502, 504) away from points (402, 404). In example 500e, optical sections (503, 505) may include a non-linear (e.g., Gaussian) profile (503p, 505p) that varies in thickness along direction (502, 504) that may be thickest at a midpoint 570 along direction (502, 504) and thinner on either side of the midpoint 570. In example 500f, optical sections (503, 505) may include non-linear and linear profiles (503p, 505p) at different portions along direction (502, 504), with profiles (503p, 505p) being linear (e.g., $V_t$ is constant) beginning at points (402, 404) and becoming non-linear some distance away from points (402, 404) (e.g., $V_t$ begins to change). In example 500g, optical sections (503, 505) may include a complex profile (503p, 505p) that varies in thickness along direction (502, 504). The foregoing are non-exhaustive and non-limiting examples of configurations and profiles for optical sections (503, 505) and actual shapes, configurations, and profiles may be application dependent and are not limited to the examples depicted herein.

In FIG. 5B, optical section 501 may include a profile 501p that is non-linear or complex as depicted in examples 500h and 500i. Profile 501p may include portions that are linear, non-linear, complex or some combination of those profiles and may not be planar with a uniform thickness as depicted in FIG. 5A. Diffuser 500 may be made from a variety of materials including but not limited to polymers, titanium oxide, polyethylene (PE), optical grade resins, acrylics, plastics, and glass, for example. Diffuser 500 may be formed using a variety of processes including but not limited to stamping, molding, injection molding, 3D printing, just to name a few. Optical sections 501, 503, and 505 may be formed as separate components or may be formed as an integrated unit that comprises diffuser 500.

Figure 6A:
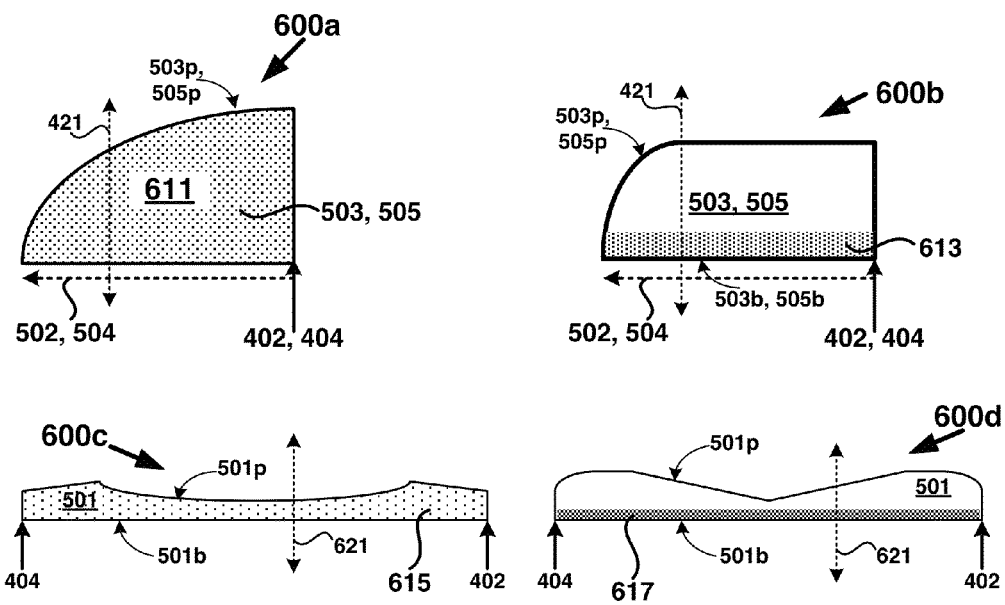
FIG. 6A depicts several non-limiting examples of modified configurations for a diffuser for a hybrid display, according to an embodiment of the present application.

FIG. 6A depicts several non-limiting examples of modified configurations 600a, 600b, 600c and 600d for diffuser 500 of hybrid display 102. The profiles (501p, 503p, 505p) depicted in FIG. 6A are for purposes of explanation only and the modified configurations 600a, 600b, 600c, and 600d are not limited to the profiles depicted. In configuration 600a, optical section 503 and/or 505 may include an optical material 611 configured to alter light 421 emitted by lo-res displays (103, 105). Optical material 611 may be operative to: alter a wavelength of the light 421 (e.g., color filter the light 421); to attenuate intensity of light 421; to disperse light 421; to increase diffusion of light 421; and to distort light 421 (e.g., affect image 104 by distorting light 421 from lo-res displays 103 and/or 105), just to name a few, for example. Optical material 611 may be disposed in an entirety of a volume of optical sections (503, 505) or optical material may be disposed in a portion of optical sections (503, 505) as depicted by optical material 613 in configuration 600b where optical material 613 is disposed proximate a bottom surface (503b, 505b) of the optical sections (503, 505). Configurations 600c and 600d depict examples of optical materials 615 and 617 in optical structure 501. Optical material 615 is disposed in an entirety of a volume of optical section 501; whereas, optical material 617 is disposed proximate a bottom surface 501b of optical section 501. The optical materials 611, 613, 615 and 617 may comprise materials that may be incorporated into optics (e.g., glass or plastic optics) including but not limited to dyes, plastic particles, pigments, metal particles, glass particles, nanoparticles, carbon black, graphite, graphene, and colored plastic, just to name a few, for example. In some examples, optical materials 611, 613, 615 and 617 may comprise a translucent and/or milky material or materials selected to alter or increase opacity, and those materials may be made from the same material as the diffuser 500 or from a different material than the diffuser 500. In examples 600b and 600d, optical materials 613 and 617 may comprise a separate layer of material that is connected with sections 503, 505 or 501 using glue, adhesives, laminating, welding, ultrasonic welding, fasteners or the like, for example.

Figure 6B:
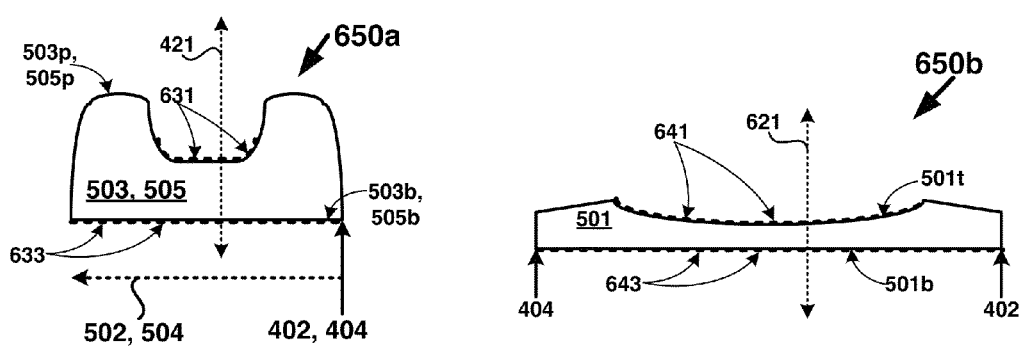
FIG. 6B depicts several non-limiting examples of modified configurations for a diffuser for a hybrid display, according to an embodiment of the present application.

Now moving down to FIG. 6B where several non-limiting examples of modified configurations 650a and 650b for a diffuser 500 for a hybrid display 102 are depicted. Here, one or more surfaces 503p, 503b, 505p, 503b, 501t or 501b may include one or more optical structures denoted as 631, 633, 641 and 643 that are operative to modify light (421, 621) from the displays (103, 105, 101). Structures 631, 633, 641 and 643 may comprise portions of the aforementioned surfaces 503p, 503*b*, 505*p*, 503*b*, 501*t* or 501*b* that have been distressed during a fabrication process to cause deformation, surface irregularities, pitting, surface roughness, darkening of the surfaces, increasing or altering opacity of the surfaces, or the like. Structures 631, 633, 641 and 643 may be formed by sand blasting, bead blasting, sanding, etching, grinding, abrasion, milling or other chemical and/or mechanical processes, for example. Structures 631, 633, 641 and 643 may be formed by applying dyes, pigments, paint, beads, or the like to the surfaces. In some examples, structures 631, 633, 641 and 643 may be micro-lenses or gratings that are connected with or formed in the surfaces 503*p*, 503*b*, 505*p*, 503*b*, 501*t* or 501*b*. Structures 631, 633, 641 and 643 may be positioned only on portions of the optical sections 501, 503 and 505 of diffuser 500.

Figure 7A:
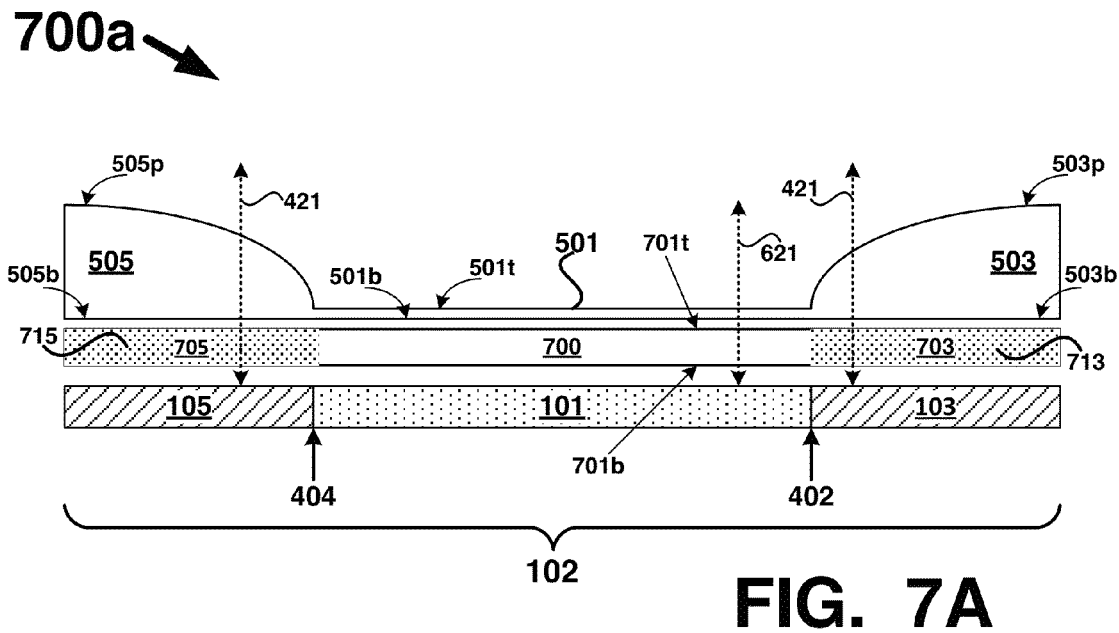
FIG. 7A depicts one example of an attenuator for a hybrid display, according to an embodiment of the present application.

Turning now to FIG. 7A where one example 700*a* of an attenuator 700 for hybrid display 102 is depicted. Attenuator 700 may be included along with diffuser 500 in optical stack 1000 as described above and as will be described in further detail below. Attenuator 700 may be made from materials that are similar to or identical to those used for diffuser 500. Sections 703 and 705 may be positioned to affect light 421 emitted by lo-res displays 103 and/or 105 and a section of attenuator 700 between points 402 and 404 may be configured to have no effect on light 621 emitted by hi-res display 101. Section 703 and/or 705 may include a material (711, 715) disposed therein and operative to attenuate light emanating from displays 103 and/or 105. The materials (711, 715) may be dispersed in an entirety of the volume that comprises sections 703 and 705 or may reside in a separate layer or be disposed in less than an entirety of the sections (703, 705) in a manner similar to that described above for diffuser 500. Light emitting elements in lo-res display 103 and/or 105 may include have intensities (e.g., brightness) that are greater than that of display 101 and sections 703 and/or 705 may be used to reduce or eliminate the bright spots. Attenuator 700 is depicted as being positioned between diffuser 500 and hybrid display 102; however, placement of the attenuator 700, diffuser 500 or other components in optical stack 1000 are not limited to the configurations depicted herein. The optical materials in sections 703 and/or 705 may comprise materials that may be incorporated into optics (e.g., glass or plastic optics) including but not limited to dyes, plastic particles, pigments, metal particles, glass particles, nanoparticles, carbon black, graphite, graphene, and colored plastic, just to name a few, for example.

Figure 7B:
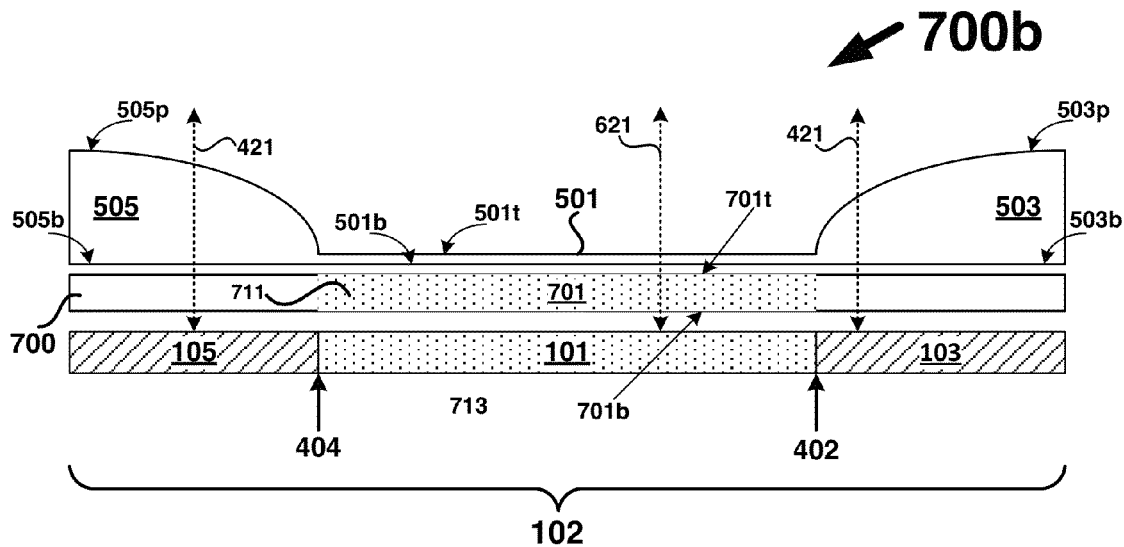
FIG. 7B depicts another example of an attenuator for a hybrid display, according to an embodiment of the present application.

In FIG. 7B, a section 701 of attenuator 700 may include attenuating material operative to attenuate light emanating from display 101 and the optical material in section 701 may be similar to that described above for sections 703 and/or 705. The optical material may be disposed through an entirety of section 701 or only in a portion of section 701. Section 701 may be used to reduce brightness of display 701 or to match brightness of light 621 to that of adjacent lo-res displays (e.g., 103, 105). A surface 701*t* of attenuator 700 may be in contact with another structure in optical stack 1000, such as a bottom surface (501*b*, 503, 505*b*) of diffuser 500. A surface 701*b* of attenuator 700 may be in contact with one or more of displays 101, 103 or 105. For example, if display 101 is an OLED display or LCD display, then it may include an upper glass surface (e.g., a substantially flat or planar surface) that surface 701*b* may be mounted on or otherwise connected with. Attenuator 700 may include one or more of the sections 701, 703 and 705 as depicted in FIGS. 7A-7B.

Reference is now made to FIG. 8A where one example 800*a* of a thin-optic 800 for a hybrid display 102 is depicted. Here, thin optic 800 may be disposed in optical stack 1000 and may include optical structures 831 and/or 833 on at least a portion of surfaces 800*t* and/or 800*b*. Structures (831, 833) may be positioned to optically affect light 421 and/or 621 from one or more of the displays 101, 103 or 105. Thin optic 800 may be positioned above diffuser 500 or be positioned elsewhere in optical stack 1000. As will be described below, structures (831, 833) may include but are not limited to a Fresnel lens, micro lenses, lens array, optical gratings, diffraction optics, and diffraction gratings, for example. Thin-optic 800 may include one or more Plano surfaces 800*p* that are substantially planar and/or optically flat.

Figure 8E:
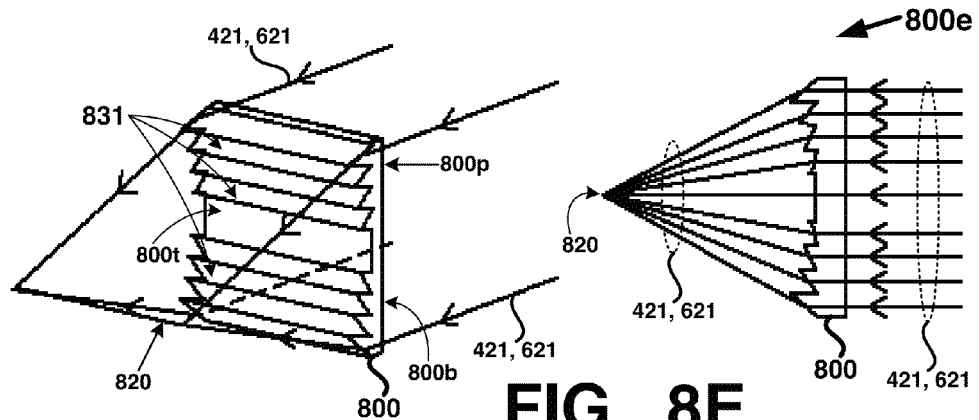

In FIGS. 8B-8E, thin optic 800 may comprise surfaces 800*t* and/or 800*b* having one or more Fresnel lenses for structures 831 and/or 833 which may be positioned on at least a portion of surface 800*t* and/or 800*b*. In FIG. 8B, example 800*b* includes Fresnel lens structures 831 and 833 disposed on surfaces 800*t* and 800*b*; whereas, in FIGS. 8D-8E, examples 800*d* and 800*e* include Fresnel lenses structures 831 or 833 on only one surface 800*t* or 800*b* and the other surface may comprise a Plano surface 800*p*. Fresnel lenses structures 831 or 833 may be configured to collimate, bend, focus or otherwise direct light (421, 621) from one or more of the displays (101, 103, 105) in hybrid display 102 to a particular point and/or to achieve a particular effect such as limiting angle of view of the hybrid display 102, for example.

As one example, in FIGS. 8D-8E, light (421, 621) may be focused to a focal point 820 which may coincide with point 420 where image 104 may be observed. In FIG. 8C, example 800*c* includes Fresnel lenses structures denoted as 800L positioned over the lo-res displays (103, 105) and a different structure 800L over the hi-res display 101. The Fresnel lenses structures 800L may be symmetrically disposed about an axis 845. The Fresnel lenses may be used to diffuse light from one or more of the displays (101, 103, 105) instead of focusing the light from those displays, for example. The Fresnel lenses may be optimized to efficiently diffuse the light from those displays. Optionally, as another example, the Fresnel lenses may be used to defocus light (e.g., in a tunable fashion) from one or more of the displays (101, 103, 105) instead of focusing the light from those displays. CAD tools may be used to simulate and design the Fresnel lenses for focusing, defocusing, diffusing, or some combination of those effects, or other effects.

Figure 8F:
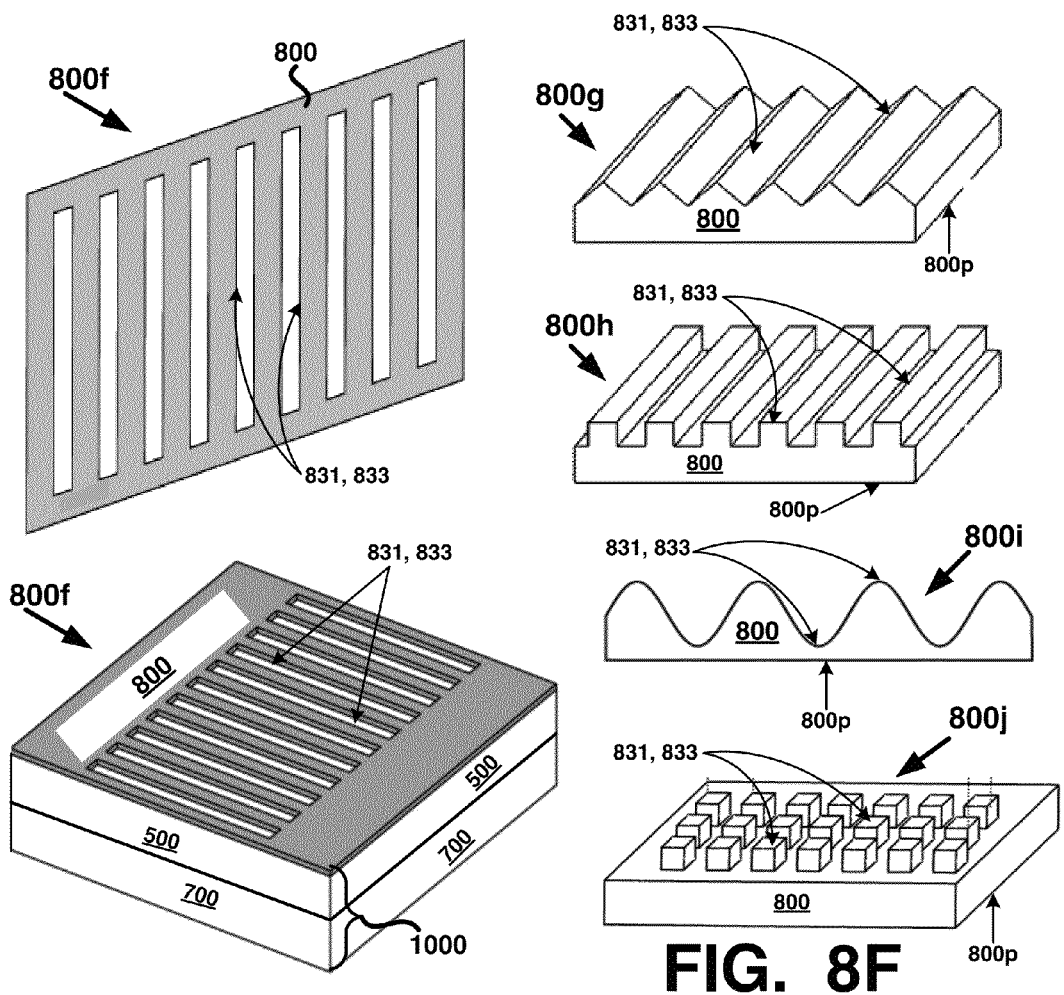

In FIG. 8F, thin optic 800 may comprise a grating such as an optical grating, diffraction optics, of diffraction grating, for example. In example 800*f* the thin optic 800 may comprise a substrate having a plurality of slots or apertures (831, 833) formed therein (e.g., a through hole) to define an optical grating in the substrate. Thin optic 800 may be coupled with other elements in optical stack 1000, such as being disposed on diffuser 500 and diffuser 500 being disposed on attenuator 700, for example. In examples 800*g*, 800*h* and 800*i*, thin optic 800 may include a variety of profiles for 831 and/or 833 including but not limited to an angular profile in example 800*g*, a rectangular profile in example 800*h*, an arcuate profile in example 800*i*, a pillar or post profile in example 800*j*, or some combination of the forgoing. The profiles in examples for FIG. 8F may be disposed on one or both surfaces (800*t*, 800*b*) of the thin optic 800 and at least a portion of surfaces (800*t*, 800*b*) may include a Plano portion 800*p*. In some examples, thin optic may have surfaces (800*t*, 800*b*) that are entirely Plano 800*p* surfaces and the diffraction optics and/or structures are disposed in an interior of the thin optic 800.

Figure 9A:
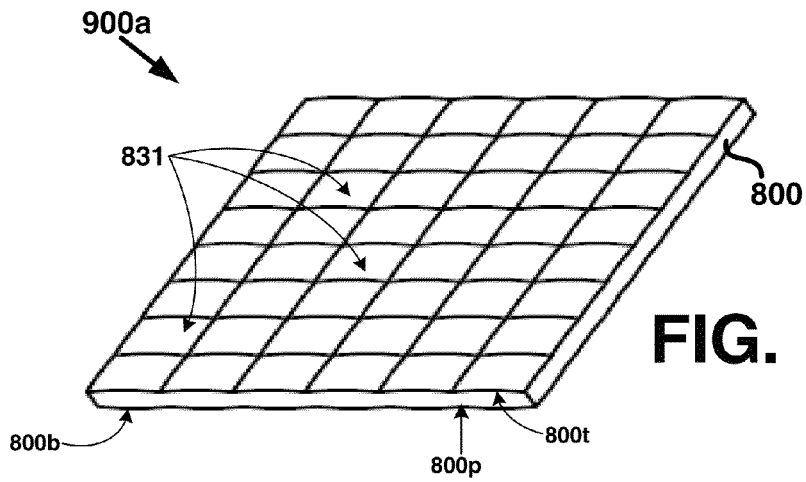
FIGS. 9A-9D depict several non-limiting examples of lens array thin-optics for a hybrid display, according to an embodiment of the present application.
Figure 9B:
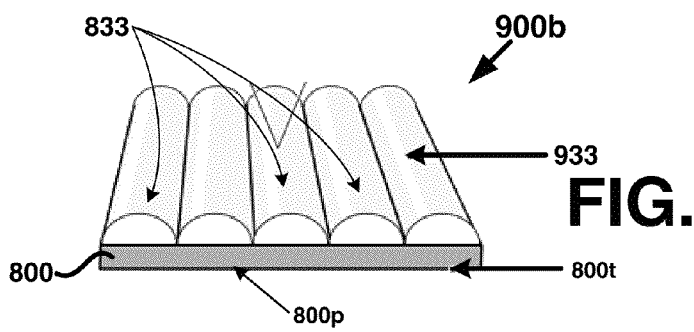
Figure 9C:
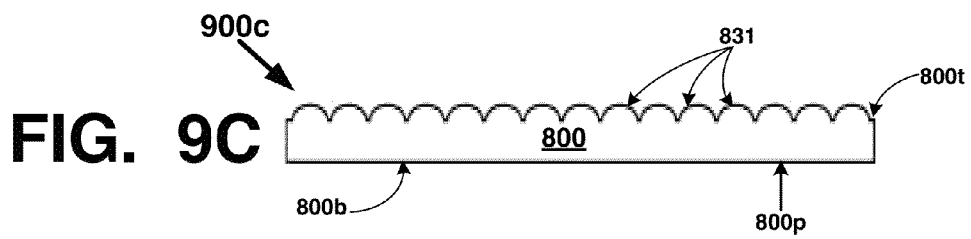
Figure 9D:
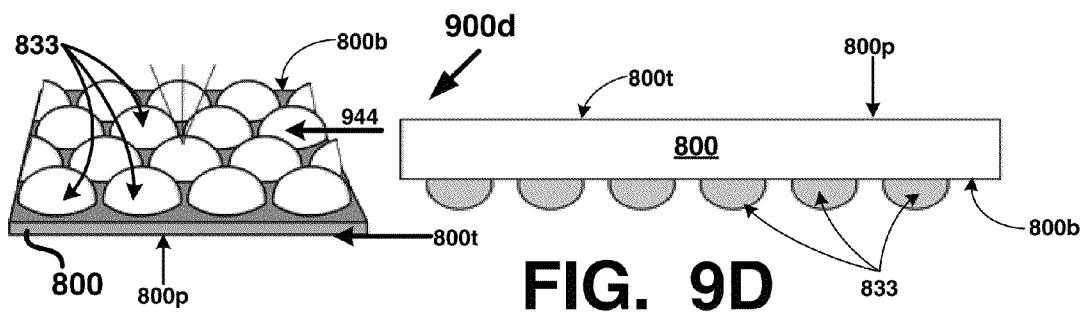

In contrast, FIGS. 9A-9D depict several non-limiting examples of lens array thin-optics 800 for the hybrid display 102. In FIG. 9A, thin optic 800 may include a plurality of lenses 831 disposed on surface 800*t* (e.g., in an array configuration) and surface 800*b* may be a Plano surface 800*p*, or vice-versa with lenses 833 disposed on surface 800*b* and surface 800*t* may be the Plano surface 800*p* (not shown). In FIG. 9B, thin optic 800 may include a plurality of lenses 833 on surface 800*b*, and the lenses 833 may have a cylindrical or semi-cylindrical profile or shape 933. In FIG. 9C, a cross-sectional view of thin optic 800 includes a plurality of lenses 831 on surface 800*t* and surface 800*b* may be the Plano surface 800*p*. In FIG. 9D, cross-sectional and profile views of thin optic 800 include an array configuration of lenses 833 on surface 800*b* with lenses 831 including a semi-hemispherical profile and surface 800*t* may be the Plano surface 800*p*. Both surfaces 800*t* and 800*b* may include lens structures (831, 833) (e.g., similar to example 800*b* of FIG. 8B).

Attention is now directed to FIG. 10A were several non-limiting examples of an optical stack 1000 for a hybrid display 102 are depicted. Prior to discussing the examples of optical stacks, it may prove helpful to first discuss some of the applications of the optical stack 1000 as it relates to how it may affect light from pixels or other light emitting elements of hybrid display 102. As mentioned above, hybrid display 102 may comprise different display technologies such as OLED for the hi-res display 101 and discrete LED's for lo-res displays (103, 105), for example. Differences in display technologies may lead to differences in light output (e.g., intensity of light), beam patterns, beam spread, spot size, light fall off, etc., from the light emitting elements of the different display technologies. Therefore, it may be desirable to affect light output from the lo-res and/or hi-res displays that form the image 104 (see FIGS. 1A-1D) of the hybrid display 102.

In FIG. 10A, light 421 emitted by a light source (e.g., a SMT LED) in lo-res display (e.g., 103 and/or 105) produces a native (e.g., un-altered) spot size having diameter 1001*n* that is wider than desired for display 102. For example, a spot size 1001*n* may be so wide that it overlaps or bleeds into spot sizes of adjacent pixels in the lo-res display or with pixels in the hi-res display (e.g., approximate to points 402 and/or 404 where lo-res and hi-res displays are closest to each other). Therefore, one application of optical stack 1000 may be to optically alter the spot size diameter 1001*n* to a smaller diameter spot size. The smaller spot size may remedy the overlap/bleeding or may more closely match a spot size in the hi-res display 101 and/or the lo-res display (103, 105). To that end, in FIG. 10A, the light 421 emitted by the light source passes through optical stack 1000, is optically altered by one or more of the diffuser 500, the attenuator 700, or thin optic 700 and exits the optical stack and produces spot size diameter 1001*e* that is smaller in diameter than 1001*n* (e.g., spot size diameter 1001*e*<1001*n*).

As another example, the light source may have a native axial intensity I versus distance X pattern as depicted by plot 1010 of graph 1099 and a preferred axial intensity I versus distance X pattern is depicted by plot 1020 of graph 1099. Here, the native pattern may have its highest intensity I at its center (e.g., X=0 in graph 1099) as denoted by arrow 1011 in the image 1098 above graph 1099 and line 1011 in the graph 1099. The native pattern may also have a bright ring surrounding the central maximum denoted by arrow 1013 and line 1013. The brightness of the maximum and the bright ring may result in a hybrid display in which the image 104 include hot spots that appear brighter in some portions of the image 104 and/or a mismatch between pixels in the same display or between pixels in the lo-res display and hi-res displays. In this example, optical stack 1000 may incorporate one or more of the diffuser 500, the attenuator 700, or thin optic 700 to alter the intensity pattern to produce a spot having a more blended or homogenous light intensity distribution as denoted by arrow 1012 in image 1098 and line 1012 in graph 1099. Here, the intensity at arrows 1012 in graph 1099 is lower than points 1011 and 1013 and the resulting spot on the right side of image 1098 includes a more diffuse or spread out light profile that is not unevenly more intense towards the center as is the cast with the spot to the left in image 1098. Light intensity (e.g., brightness) may be controlled using a variety of techniques including but not limited to hardware (e.g., circuitry), software (e.g., firmware), of some combination of hardware and software, for example.

Non-limiting examples of what may comprise optical stack 1000 include but are not limited to: an example 1000*a* having a diffuser 500; an example 1000*b* having a diffuser 500 and Fresnel thin optic 800; an example 1000*c* having a diffuser 500 and an attenuator 700; and example 1000*d* having an attenuator 700, diffuser 500 and Fresnel thin optic 800; an example 1000*e* having a lens array thin optic 800, a diffuser 500 and attenuator 700; an example 1000*f* having a lens array thin optic and diffuser 500; an example 1000*g* having an attenuator 700, diffuser 500 and optical grating thin optic 800; an example 1000*h* having an attenuator 700; and an example 1000*i* having a diffraction grating thin optic 800 and an attenuator 700, just to name a few combinations of elements in optical stack 1000.

In FIG. 10B examples of diagrams of spot size and beam spread from light emitting elements of a hybrid display 102 are depicted. Here a spot size diameter 1021 for pixels in a hi-res display (e.g., 101) is smaller in diameter than a native spot size diameter 1023 for pixels in a lo-res display (e.g., 103 and/or 105). The native spot size diameter may comprise the spot size without any optical processing by element(s) in optical stack 1000, for example. Here, spot 1021 may include a central portion having a first intensity I denoted by arrow 1015 and spot 1023 may include a central portion having a second intensity I denoted by arrow 1017, where the second intensity I is greater than the first intensity I. It is preferred that the spot size diameter 1023 be reduced in diameter to a size that more closely approximates or matches spot size diameter 1021 in the hi-res display and to reduce the second intensity I so that the lo-res display does not include a hot spot and/or does not appear brighter than the hi-res display.

Light 421 from lo-res display may pass through optical stack 1000 and be optically altered by one or more elements in optical stack 1000 (e.g., 500, 700, 800) to produce light 421 having the preferred spot size diameter and a third intensity I as denoted by spot size diameter 1025 and arrow 1019. Here, diameter 1025 may be less than 1023 and be greater than 1021. Arrow 1019 depicts a central region of spot 1025 that does not include hot spots or areas of increased intensity unlike that depicted by arrow 1017 for the native spot size. From a perspective of a viewer of the hybrid display 102, images 104 presented on lo-res displays 103 and 105 may appear to be less distinct or less well defined (e.g., of lower resolution) than images presented on hi-res display 101 due in part to a slightly larger spot size 1025 which is greater than spot size 1021 and/or a lower intensity for the third intensity I that is less than first intensity I. Therefore, images 104 in lo-res displays (103, 105) may appear blurrier and have lower intensity I than images 104 in hi-res display 101. The foregoing are non-limiting examples of how optical stack 1000 may be used to affect the image 104. In some examples, elements of optical stack 1000 may optically alter light from one or more lo-res displays only, one or more hi-res display only, all displays, or some combination of lo-res and hi-res displays.

Figure 11:
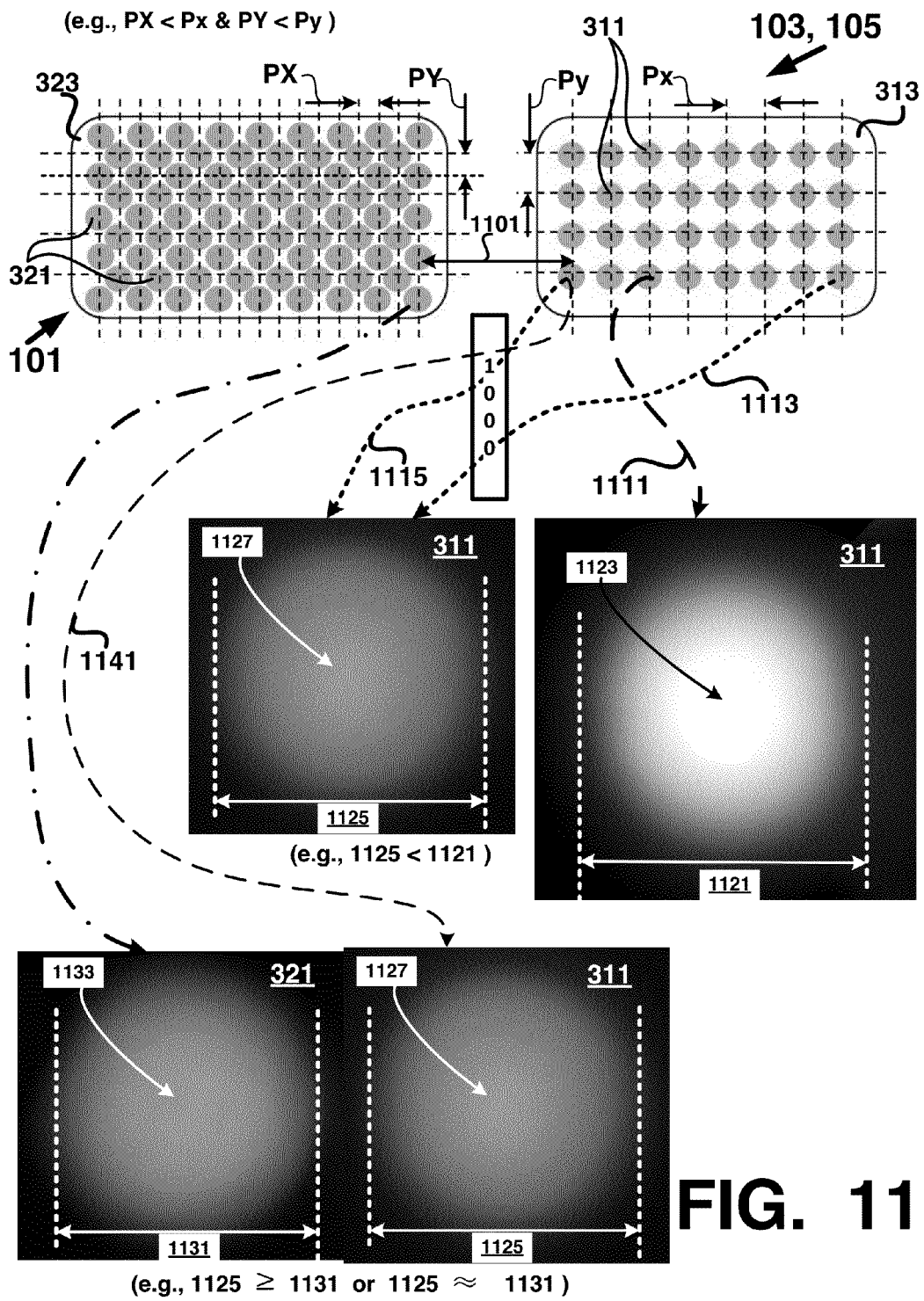
FIG. 11 depicts non-limiting examples of an optical stack for modifying beam characteristics for a hybrid display, according to an embodiment of the present application.

Now directing attention to FIG. 11 where non-limiting examples of an optical stack 1000 for modifying beam characteristics for a hybrid display 102 are depicted. In FIG. 11 for purposes of explanation it may be assumed that hi-res display 101 has a higher pixel density (e.g., more pixels 321 per unit of area) than lo-res display (103, 105) and that pixel pitches PX and PY in display 101 are smaller than pixel pitches Px and Py in lo-res displays (103, 105). Now consider a preferred spot size and a first intensity I for light emitted by pixels 311 in the lo-res displays (103, 105) as depicted by spot size 1125 having intensity I 1127 as compared to a native spot size 1121 of pixel 311 having a second intensity I as denoted by arrow 1123. Here, proximate a center of spot 1211, light intensity is higher and may produce a visually noticeable hot spot within the image 104 presented by the lo-res displays (103, 105). Spot size 1121 and second intensity I may result from light emitted by pixels 311 that does not pass through optical stack 1000 as denoted by dashed line 1111.

It may be desirable for all pixels 311 to have the preferred spot size 1125 and first intensity I. Accordingly, light 1113 and 1115 from the first and last pixels in the row (or from other pixels 311) may pass through optical stack 1000 and be optically altered to produce the desired spot size and light intensity such that spot diameter 1125 is less than spot size 1121 and the first intensity I 1127 is less than the second intensity I 1123. Similarly, pixels 311 in the other rows and columns of substrate 313 may emit light that passes through optical stack 1000 to produce images 104 having the spot size 1125 and the first intensity I 1127.

As another example, when substrate 323 is positioned a distance 1101 from substrate 313 it may be desirable to have pixels 311 that are disposed in the rows of the last column be closely matched in spot size and intensity distribution as pixels 321 in hi-res display 101. Spacing 1101 may be zero (0) with both substrates 313 and 323 in contact with each other or spacing 1101 may be a non-zero distance such as an integral or fractional number of pixel pitches (e.g., PX or Px). For example spacing 1101 may comprise a distance between substrates 313 and 323 that is approximately three times the pixel pitch Px of the lo-res displays (103, 105). Here, spot size 1131 of pixels 321 has a third intensity I 1133 and it is preferred that pixels 311 that are disposed in the rows of the last column be closely matched in spot size and intensity distribution as pixels 321 in hi-res display 101 such that the spot size 1125 is either approximately equal to spot size 1131 or is greater than or equal to spot size 1131. Light 1141 emitted by the pixels 311 in the rows of the last column of substrate 313 may pass through optical stack 1000 and be optically altered to produce the desired spot size and intensity as depicted by the side-by-side images in FIG. 11.

Figure 12:
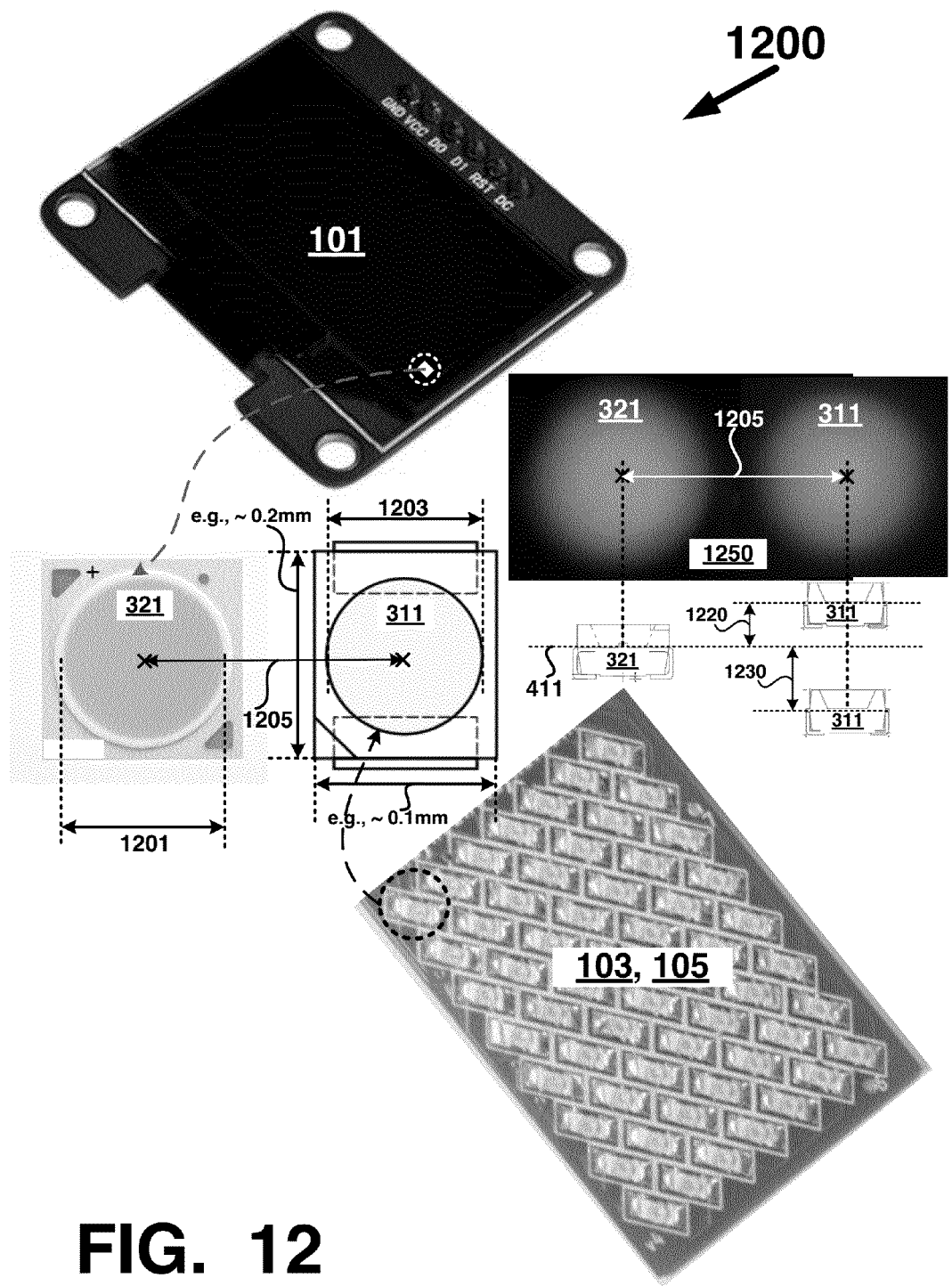
FIG. 12 depicts non-limiting examples of pixel size and pixel positioning for a hybrid display, according to an embodiment of the present application.

Description now moves to FIG. 12 where non-limiting examples of pixel size and pixel positioning for a hybrid display 102 are depicted. For purposes of explanation it may be assumed that hi-res display 101 has a higher pixel density for its pixels 321 and lo-res displays (103, 105) have a lower pixel density for its pixels 311. Pixels 311 in the lo-res displays (103, 105) may comprise a surface mount light emitting device such as a discrete LED, for example. Pixels 311 may be arranged in an orderly manner such as in a dot-matrix or array or may be arranged in some other pattern that may not have order. Here, pixels 321 and 311 may have pixel sizes 1201 and 1203, respectively. The pixel size may not be the same as the overall device size, such as in a surface mount LED where the package and solder pads, etc. may add extra physical dimension that exceeds the actual size of the pixel that emits the light. Hi-res 101 and lo-res (103, 105) may be positioned relative to one another (see FIGS. 4A-4C) such that pixels in adjacent displays are spaced apart by a distance 1205 (see also 1101 in FIG. 11) which may be some integral or fractional spacing based on pixel pitch or some other factor such as blending images at the junction between adjacent lo-res and hi-res displays. In FIG. 12, it may be preferred that pixel sizes of pixels in the lo-res and hi-res displays be as closely matched as possible. For example, if pixels 311 in lo-res display (103, 105) comprise surface mount discrete LED's (multi-color or monochromatic), then pixel size 1203 may be selected to be as close as possible to pixel size 1201 of the hi-res display 101. In that in some examples, hi-res display 101 may comprise monolithically integrated pixels 321 that are co-fabricated on the same semiconductor substrate, those pixels may be spaced closer together (e.g., a smaller pitch) than the surface mount pixels of lo-res display (103, 105). However, the pixel size (e.g., size of light emitting semiconductor die) of the pixels 311 may still be small relative to a size of the package the pixel is mounted in. Therefore, matching pixels sizes of the light emitting elements may be used to achieve more consistent beam patterns (e.g., spot sizes and intensity fall off).

In FIG. 12, pixel size (1201, 1203), spacing 1205 between adjacent pixels 321 and 311 and relative vertical positions (1220, 1230) of the pixels relative to a reference point such as reference point 411 may be used to fashion the appearance, blending, matching, light intensity, spot size, intensity fall off or other beam or image parameters of the displays (101, 103, 105). For example, image 1250 depicts adjacent beam patterns for pixels 321 and 311. Pixels 321 and 311 may be directly adjacent to each other due to their respective arrays being adjacently positioned and spaced apart by distance 1205. Factors such as optical stack 1000, distance 1205, and relative vertical positions (1220, 1230) of the pixels (321, 311) may be manipulated to obtain the beam pattern depicted in image 1250 where spot sizes are approximately equal and hot spots, rings or other areas of intensity are not present, such that at the juncture between lo-res and hi-res displays, the images from the pixels 321 and 311 may be matched to provide a smooth transition of image 104 from lo-res to hi-res or vice-versa. Manipulation of the aforementioned factors may be used to produce other effects that may create images 104 that are not well matched, are distorted, etc. and the foregoing are non-limiting examples. Electronics and/or software used to drive displays 101, 103, and 105 may pre-distort images to be presented for display, may sharpen images to be presented for display (e.g., to compensate for distortions in hybrid display 102) or otherwise manipulate the displays 101, 103, and 105 to present image 104 in some desired form that may be visually perceived. One or more pixels in displays 101, 103, and 105 may be addressed to control their light output, color, or other parameters to affect image 104.

Turning to FIG. 13A where a cross-sectional view of one example 1300a of 199 chassis including a hybrid display 102 is depicted. In example 1300a, hybrid display 102 may be mounted to a substrate 1301 that is positioned inside chassis 199 and optionally, optical stack 1000 may be connected with and/or positioned on or over hybrid display 102. Hybrid display 102 and optical stack 1000 may be oriented in chassis 199 such that light (421, 621) emitted by hybrid display 102, passes through optical stack 1000 (if any) and through an optically transparent or translucent portion 199c of chassis 199 to form image 104 at position 420 which may be at surface 199s, above surface 199s, or below surface 199s, for example. Hybrid display 102 may be prefabricated with displays 101, 103 and/or 105 connected as an assembly that is later connected with optical stack 1000 (if any) and then positioned in jig or mold for an injection molding process or positioned in an already fabricated housing that comprises chassis 199, for example.

Chassis 199 may comprise an injection molded component that forms a wearable device such as a data capable strap band, smart watch, fitness band, portable media device, wireless client device, or the like. A 2 k molding process may be used to fabricate chassis 199 and optically transparent or translucent portion 199c if the colors and/or optical properties of some portions of chassis 199 are not optically suitable for passing light (421, 621) emitted by hybrid display 102. In FIG. 13B, another example 1300b depicts a chassis 199 that does not include the portion 199c because a material for chassis 199 is optically suitable for passing light (421, 621) emitted by hybrid display 102.

Chassis 199, portion 199c, substrate 1301, optical stack 1000, hybrid display 102 (e.g., 101, 103, 105) or some combination of the foregoing may be configured to be flexible, semi-flexible, stiff, rigid, or semi-rigid. For example, display 101 may comprise a high resolution passive or active matrix OLED display that includes a glass substrate that may not be bent or flexed without damaging the display 101 and therefore may be regarded as rigid; whereas, displays 103 and/or 105 may comprise discrete SMT LED's mounted to flexible PC board and therefore may be regarded as being flexible. Hybrid display 102 may therefore include rigid (101) and flexible (103, 105) portions. Substrate 1301 may have a rigid portion connected with hi-res display 101 and flexible portions connected with lo-res displays (103, 105). Chassis 199 may be bent, flexed, distorted etc., along the flexible portions and rigid along the rigid portions. Substrate 1301 may include electrically conductive traces, a parallel bus, a serial bus, universal serial bus (USB), or other electrical structures to couple power, data, control, and other electrical signals to displays 101, 103, and 105 of hybrid display 102. Displays 101, 103, and 105 of hybrid display 102 may include internal electronics (e.g., display driver circuitry), may be coupled with external electronics or both. Hi-res display 101 may include driver electronics and other electronic systems that may be monolithically fabricated on the same substrate as the pixels 321. Lo-res displays 103 and/or 105 may include circuitry that may be SMT circuitry and/or ASIC's that are mounted to the same substrate as pixels 311. Display driver circuitry that receives control and image data signals (e.g., for text, ASCII characters, images, graphics, icons, a GUI, photos, video, etc.) may be integrated with Displays 101, 103, and 105 of hybrid display 102 or may be external to displays 101, 103, and 105 of hybrid display 102 (e.g., in computer system 200 of FIG. 2). An application specific integrated circuit (ASIC), a field programmable gate array (FPGA) or other circuitry may be used to drive displays 101, 103, and 105 of hybrid display 102.

In FIG. 13C a cross-sectional view of one example 1300d of a chassis 199 that includes a scrim structure 1350 and a hybrid display 102 is depicted. Scrim structure 1350 may be positioned a distance 1353 above optical stack 1000 (if any) and/or hybrid display 102. Distance 1353 may be uniform as may be the case when scrim structure 1350 comprises a substantially planar or planar structure as depicted, or distance 1353 may vary as may be the case when scrim structure 1350 comprises a non-planar structure such as an arcuate shape, non-linear shape, etc. Light (421, 621) emitted by hybrid display 102 may form image 104 on a surface of scrim 1350, such as an upper surface 1357 and/or a lower surface 1359. Light (421, 621) emitted by hybrid display 102 may also pass through scrim 1350 and through an optically transparent and/or translucent portion of chassis 199 (e.g., exiting through surface 199s). From a perspective of a viewer looking at chassis 199, image 104 is presented as depicted in example 1300c but appears to be submerged in the chassis 199 at some perceived depth of 1360 below surface 199s, for example. If scrim structure 1350 is non-planar, image 104 may appear to be non-uniform, wavy, twisted, or otherwise distorted. Scrim structure 1350 may be made from a flexible, rigid, or semi-flexible material that is not totally opaque to the light (421, 621) from hybrid display 102. Scrim structure 1350 may be made from optically transparent, optically translucent, or other materials of having suitable optical properties to serve as a scrim (e.g., screen). Scrim structure 1350 may be porous, may include apertures or through holes, or other structures. For example, scrim structure 1350 may be a sheet or film of plastic that has been distressed, or has a milky appearance. Scrim structure 1350 may have a gauze like appearance or be made from a mesh or screen like material comprised of metal, plastic or glass, for example.

The examples depicted in FIGS. 13A-13C are non-limiting examples and hybrid display 102 may be mounted in or connected with a variety of different structures, devices and systems that may be application dependent. Hybrid display 102 may comprise more or fewer displays than depicted herein and the displays that comprise hybrid display 102 may have a variety of shapes, configurations, and technologies.

Optical structures in optical stack 1000, beam patterns (e.g., spot size, spreading, light intensity, light dispersion, light scattering, etc.), pixel pitches, pixel sizes, spacing between displays, etc., may be designed and/or simulated using CAD and EDA software tools such as MATLAB®, SYNOPSYS® CODE V®, Mathematica®, open source design and simulation tools, just to name a few. Optical structures in optical stack 1000 may include but are not limited to linear optics, non-linear optics, aspheric lens and/or optics, flexible optics, inflexible optics, color filtering optics, and polarizing optics, just to name a few, for example. CAD and EDA hardware design, simulation and verification tools such as those from SYNOPSYS®, or Cadence® may be used to design the display driver circuitry and/or displays 101, 103, 105. One or more processor (e.g., μP, μC, or DSP) or electrical system include in chassis 199 may be used to electrically couple image data to displays 101, 103, 105.

Although the foregoing examples have been described in some detail for purposes of clarity of understanding, the above-described inventive techniques are not limited to the details provided. There are many alternative ways of implementing the above-described techniques or the present application. Waveform shapes depicted herein are non-limiting examples depicted only for purpose of explanation and actual waveform shapes will be application dependent. The disclosed examples are illustrative and not restrictive.

What is claimed is:

1. A hybrid display system, comprising:
a first array of light emitting pixels spaced apart from one another by a first pitch;
a second array of light emitting pixels spaced apart from one another by a second pitch;
a third array of light emitting pixels spaced apart from one another by a third pitch, the second and third arrays are positioned adjacent to opposite sides of the first array,
the first pitch is smaller than the second and third pitches and the first array includes a first pixel density that is higher than a pixel density of the second and third arrays,
the light emitting pixels of the first, second and third arrays have pixels sizes that are approximately equal;
an optical stack including
a diffuser positioned above the first, second and third arrays and having a uniform thickness profile across the first array and a variable thickness profile across the second and third arrays, the variable thickness profile having a material operative to attenuate light emitted by the light emitting pixels of the second and third arrays; and display driver circuitry electrically coupled with the first, second and third arrays and operative to receive control and image data signals for generating an image from light emitted by the light emitting pixels.

2. The hybrid display system of claim 1, wherein the optical stack further includes an attenuator positioned between the diffuser and the first, second and third arrays, the attenuator including a material operative to attenuate light emitted by the light emitting pixels in one or more of the first array, the second array or the third array.

3. The hybrid display system of claim 1, wherein the optical stack further includes a thin optic positioned above the diffuser and including at least one optical structure selected from the group consisting of a Fresnel lens, a lens array, a plurality of lenses, a grating, a diffraction optic, a diffraction grating, and an optical grating.

4. The hybrid display system of claim 3, wherein the optical structure is positioned only over the second array, the third array or both.

5. The hybrid display system of claim 1, wherein one or more surfaces of the diffuser includes an optical structure operative to optically modify light emitted by the light emitting pixels of one or more of the first array, the second array or third array.

6. The hybrid display system of claim 1, wherein the light emitting pixels of the first array comprise organic light emitting diodes (OLED).

7. The hybrid display system of claim 1, wherein the light emitting pixels of the second and third arrays comprise discrete light emitting diodes (LED).

8. The hybrid display system of claim 1, wherein the first array is formed on an inflexible substrate and the second array and third array are formed on different flexible substrates.

9. The hybrid display system of claim 1, wherein the optical stack further includes a scrim positioned above the diffuser.

10. A wearable device including a hybrid-density-hybrid-resolution display, comprising:
    a chassis operative to be removeably worn on a body of a user and including an optically transparent portion for viewing an image;
    a hybrid display positioned in facing relation to the optically transparent portion and operative to display the image, the hybrid display including
        a high-resolution display having a first pixel density and light emitting pixels spaced apart by a first pitch,
        a low-resolution display positioned adjacent to a side of the high-resolution display and having a second pixel density and light emitting pixels spaced apart by a second pitch, the second pitch is greater than the first pitch and the second pixel density is lower than the first pixel density, wherein the light emitting pixels of the low-resolution and high-resolution displays have pixels sizes that are approximately equal; and
    an optical stack including a diffuser positioned above the low-resolution and high-resolution displays and having a uniform thickness profile across the high-resolution display and a variable thickness profile across the low-resolution display, the optical stack having a scrim positioned above the diffuser.

11. The wearable device of claim 10, wherein the optical stack further includes a thin optic positioned above the diffuser and including at least one optical structure selected from the group consisting of a Fresnel lens, a lens array, a plurality of lenses, a grating, a diffraction optic, a diffraction grating, and an optical grating.

12. The wearable device of claim 10, wherein the optical stack further includes an attenuator positioned between the diffuser and the low-resolution and high-resolution displays, the attenuator including a material operative to attenuate light emitted by the light emitting pixels in the low-resolution display, the high-resolution display or both.

13. The wearable device of claim 10, wherein the variable thickness profile includes a material operative to attenuate light emitted by the light emitting pixels of the low-resolution display, the high-resolution display or both.

14. The wearable device of claim 10, wherein one or more surfaces of the diffuser includes an optical structure operative to optically modify light emitted by the light emitting pixels of the low-resolution display, the high-resolution display or both.

15. The wearable device of claim 10, wherein the light emitting pixels of the high-resolution display comprise organic light emitting diodes (OLED) and the light emitting pixels of the low-resolution display comprise a non-OLED type of light emitting device.

16. The wearable device of claim 10, wherein the high-resolution display is formed on an inflexible substrate and the low-resolution display is formed on a flexible substrate.

\* \* \* \* \*